United States Patent
Choi et al.

(10) Patent No.: US 12,279,237 B2
(45) Date of Patent: *Apr. 15, 2025

(54) METHOD AND APPARATUS FOR TRANSMITTING AND RECEIVING GROUP DOWNLINK CONTROL CHANNEL IN WIRELESS COMMUNICATION SYSTEM

(71) Applicant: Samsung Electronics Co., Ltd., Suwon-si (KR)

(72) Inventors: Seung Hoon Choi, Seongnam-si (KR); Tae Hyoung Kim, Seoul (KR); Young Bum Kim, Seoul (KR); Sung Jin Park, Incheon (KR); Jin Young Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

This patent is subject to a terminal disclaimer.

(21) Appl. No.: 17/109,555

(22) Filed: Dec. 2, 2020

(65) Prior Publication Data

US 2021/0092739 A1    Mar. 25, 2021

Related U.S. Application Data

(63) Continuation of application No. 16/201,200, filed on Nov. 27, 2018, now Pat. No. 10,863,503.

(30) Foreign Application Priority Data

Sep. 29, 2017 (KR) .......................... 10-2017-0128266

(51) Int. Cl.
*H04W 72/0446* (2023.01)
*H04W 72/23* (2023.01)

(52) U.S. Cl.
CPC ........ *H04W 72/0446* (2013.01); *H04W 72/23* (2023.01)

(58) Field of Classification Search
CPC .......... H04W 72/0446; H04W 72/042; H04W 72/23; H04W 72/231; H04W 72/232
See application file for complete search history.

(56) References Cited

U.S. PATENT DOCUMENTS 10,863,503 B2 * 12/2020 Choi ................ H04W 72/0446
2008/0159218 A1 * 7/2008 Dwarakanath ........ H04W 28/06
370/329

(Continued)

OTHER PUBLICATIONS

CATT, R1-1715815, Outstanding aspects of slot format indication, 3GPP TSG RAN, WG1 #AH, 3GPP TSG RAN WG1 Meeting AH_#NR3 R1-1715815, Nagoya, Japan, Sep. 18-21, 2017.

(Continued)

*Primary Examiner* — Chirag G Shah
*Assistant Examiner* — Joshua Smith
(74) *Attorney, Agent, or Firm* — Jefferson IP Law, LLP

(57) ABSTRACT

A communication method and system for converging a 5th-generation (5G) communication system for supporting higher data rates beyond a 4th-generation (4G) system with a technology for Internet of things (IoT) are provided. The disclosure may be applied to intelligent services based on the 5G communication technology and the IoT-related technology, such as smart home, smart building, smart city, smart car, connected car, health care, digital education, smart retail, security and safety services.

12 Claims, 12 Drawing Sheets

(56) References Cited

U.S. PATENT DOCUMENTS

| | | | | |
|---|---|---|---|---|
| 2013/0114539 | A1* | 5/2013 | Kim | H04W 72/23 |
| | | | | 370/329 |
| 2014/0192729 | A1 | 7/2014 | Kim et al. | |
| 2014/0247814 | A1* | 9/2014 | Zhang | H04W 52/58 |
| | | | | 370/336 |
| 2015/0181597 | A1* | 6/2015 | Malladi | H04W 72/0446 |
| | | | | 370/329 |
| 2016/0128028 | A1* | 5/2016 | Mallik | H04W 72/0446 |
| | | | | 370/336 |
| 2017/0086221 | A1 | 3/2017 | Jover | |
| 2017/0111933 | A1* | 4/2017 | Wu | H04W 72/0446 |
| 2017/0332359 | A1 | 11/2017 | Tsai et al. | |
| 2018/0092070 | A1 | 3/2018 | Liao et al. | |
| 2019/0014598 | A1* | 1/2019 | Yoshimura | H04W 72/04 |
| 2019/0053243 | A1* | 2/2019 | Lee | H04W 72/0446 |
| 2019/0141737 | A1 | 5/2019 | Kim et al. | |
| 2019/0215831 | A1 | 7/2019 | Baldemair et al. | |
| 2019/0230642 | A1 | 7/2019 | Baldemair et al. | |
| 2020/0163068 | A1 | 5/2020 | Takeda et al. | |
| 2021/0068059 | A1* | 3/2021 | Yasukawa | H04W 72/0473 |
| 2021/0288771 | A1* | 9/2021 | Kim | H04L 5/0007 |

OTHER PUBLICATIONS

3GPP, TS36.331 v10.1.0, 3rd Generation Partnership Project; Technical Specification Group Radio Access Network; Evolved Universal Terrestrial Radio Access (E-UTRA); Radio Resource Control (RRC); Protocol specification (Release 10), Mar. 2011.
LG Electronics, R1-1715873, Discussion on group common PDCCH, 3GPP TSG RAN WG1, #AH, 3GPP TSG RAN WG1 NR Ad Hoc #3 R1-1715873, Nagoya, Japan Sep. 18-21, 2017.
Korean Office Action dated Apr. 25, 2022, issued in Korean Application No. 10-2017-0128266.
Samsung, "DL and UL Assignment for NR TDD," 3GPP TSG RAN WG1 Meeting NR#3, R1-1715986, Nagoya, Japan, Sep. 18-21, 2017.
Notice of Allowance dated Oct. 17, 2022, issued in Korean Application No. 10-2017-0128266.

* cited by examiner

METHOD AND APPARATUS FOR TRANSMITTING AND RECEIVING GROUP DOWNLINK CONTROL CHANNEL IN WIRELESS COMMUNICATION SYSTEM

CROSS-REFERENCE TO RELATED APPLICATION(S)

This application is a continuation application of prior application Ser. No. 16/201,200, filed on Nov. 27, 2018, which issued as U.S. Pat. No. 10,863,503 on Dec. 8, 2020; and which is based on and claims priority under 35 U.S.C. § 119(a) of a Korean patent application No. 10-2017-0128266, filed on Sep. 29, 2017, in the Korean Intellectual Property Office, the disclosure of which is incorporated by reference herein in its entirety.

BACKGROUND

1. Field

The disclosure relates to a method and an apparatus for transmitting and receiving a group downlink control channel in a wireless communication system.

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Meanwhile, various studies have been conducted to efficiently determine the slot format according to the development of the next generation communication system.

The above information is presented as background information only to assist with an understanding of the disclosure. No determination has been made, and no assertion is made, as to whether any of the above might be applicable as prior art with regard to the disclosure.

SUMMARY

In 5th-generation (5G), as group common downlink control information (DCI), a slot format indicator (SFI) may be transmitted from a base station to a terminal. A slot format may include a combination of downlink symbols, uplink symbols, and unknown symbols.

Aspects of the disclosure are to address at least the above-mentioned problems and/or disadvantages and to provide at least the advantages described below. Accordingly, an aspect of the disclosure is to provide a method by which SFIs for one or more slots are transmitted by the base station and the terminal receives the SFIs and applies the SFIs to slots.

5G may support both slot-based scheduling and non-slot-based scheduling. Another aspect of the disclosure is to provide a method by which the base station configures or indicates whether to perform slot-based or non-slot-based scheduling to the terminal and a method by which the terminal applies a SFI and a non-SFI according to the configuration or indication received from the base station.

Additional aspects will be set forth in part in the description which follows and, in part, will be apparent from the description, or may be learned by practice of the presented embodiments.

In accordance with an aspect of the disclosure, a method of processing control signals in a wireless communication system is provided. The method includes receiving, from a base station, a message including information on a slot format for one or more slots, receiving, from the base station, downlink control information (DCI) including a slot format indicator (SFI), identifying a slot format for at least one slot based on the information and the SFI, and communicating with the base station in the at least one slot based on the slot format.

As described above, the disclosure provides an effective cell initial access and paging method in a 5G communication system supporting various numerologies, thereby efficiently operating a 5G wireless communication system that simultaneously supports various services having different requirements.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
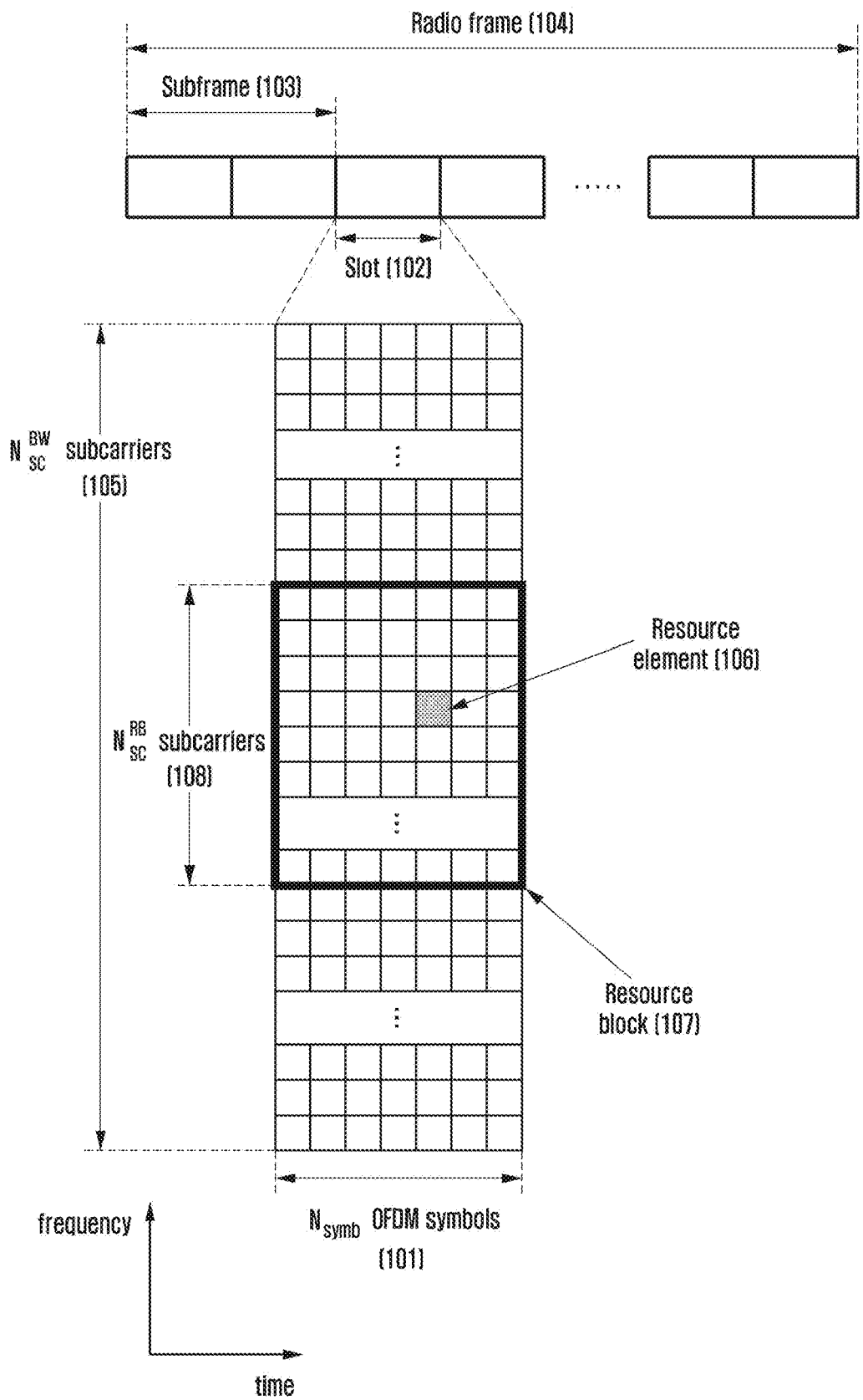
FIG. 1 illustrates the basic structure of time-frequency domains in long-term evolution (LTE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Wireless communication systems have developed into broadband wireless communication systems that provide high-speed and high-quality packet data service, like the communication standards, for example, high-speed packet access (HSPA) of 3rd generation partnership project (3GPP), long-term evolution (LTE) or evolved universal terrestrial radio access (E-UTRA), LTE-advanced (LTE-A), high rate packet data (HRPD) of 3GPP2, ultra mobile broadband (UMB), and 802.16e of institute of electrical and electronics engineers (IEEE), or the like, beyond the initial voice-based service.

An LTE system, which is a representative example of the broadband wireless communication system, employs an orthogonal frequency division multiplexing (OFDM) scheme for a downlink (DL), and employs a single carrier-frequency division multiple access (SC-FDMA) scheme for an uplink (UL). The uplink is a radio link through which a terminal (e.g., a user equipment (UE), a mobile station (MS), etc.) transmits data or a control signal to a base station (BS) (e.g., a node B, an eNode B, etc.), and the downlink is a radio link through which the base station transmits data or a control signal to the terminal. In the multiple access schemes described above, time-frequency resources for carrying data or control information are allocated and operated in a manner that prevents overlapping of the resources, i.e. to establish orthogonality, between users, to identify data or control information of each user.

A post-LTE communication system, that is, a 5th-generation (5G) communication system, should be able to freely reflect various requirements of a user and a service provider, and thus it is required to support a service which satisfies the various requirements. Services which are considered for the 5G communication system include enhanced mobile broadband (eMBB), massive machine-type communication (mMTC), and ultra-reliability low-latency communication (URLLC).

The eMBB aims to provide a data transmission rate which is improved to surpass the data transmission speed supported by LTE, LTE-A, or LTE-Pro. For example, in the 5G communication system, the eMBB should provide a peak downlink data rate of 20 Gbps and a peak uplink data rate of 10 Gbps from the viewpoint of one base station. Further, the 5G communication system should provide the peak data rate and an increased user-perceived data rate. In order to satisfy such requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands above 3 GHz where the data transmission rate required by the 5G communication system can be satisfied.

Also, in order to support an application service such as the Internet of things (IoT), mMTC is considered in the 5G communication system. The mMTC is required to support access of massive terminals within a cell, improve coverage of the terminal, increase a battery lifetime, and reduce the costs of the terminal in order to efficiently provide IoT. IoT is attached to various sensors and devices to provide communication, and thus should support a large number of terminals (for example, 1,000,000 terminals/km$^2$) within the cell. Further, since the terminal supporting the mMTC is highly likely to be located in an indoor area, such as a basement, which a cell cannot cover due to service characteristics, the mMTC requires wider coverage than other services provided by the 5G communication system. The terminal supporting the mMTC needs to be produced at low cost and it is difficult to frequently exchange a battery integral to the terminal, so that a very long battery lifetime, for example, 10 to 15 years, is required.

Last, the URLLC is a cellular-based wireless communication service used for a particular purpose (mission-critical). For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (i.e., air interface latency) shorter than 0.5 milliseconds and also have requirements of a packet error rate equal to or smaller than $10^{-5}$. Accordingly, for services supporting the URLLC, the 5G system should provide a transmit time interval (TTI) smaller than that of other systems and also has design requirements of allocating wide resources in a frequency band in order to guarantee reliability of a communication link.

Three services of 5G, namely eMBB, URLLC, and mMTC, may be multiplexed and transmitted in one system. At this time, in order to meet the different requirements of respective services, the services may use different transmission/reception schemes and transmission/reception parameters.

Hereinafter, the frame structure of the LTE and LTE-A systems will be described in more detail with reference to drawings.

FIG. 1 illustrates the basic structure of time-frequency domains in LTE according to an embodiment of the disclosure.

Referring to FIG. 1, the horizontal axis indicates a time domain, and the vertical axis indicates a frequency domain. A minimum transmission unit in the time domain is an OFDM symbol. One slot 102 consists of $N_{symb}$ OFDM symbols 101 and one subframe 103 consists of 2 slots. The length of one slot is 0.5 ms, and the length of one subframe is 1.0 ms. A radio frame 104 is a time-domain unit consisting of 10 subframes. The minimum transmission unit in the frequency domain is a subcarrier, and an entire system transmission bandwidth consists of a total of $N_{BW}$ subcarriers 105. A basic unit of resources in the time-frequency domain is a resource element (RE) 106, and an RE is expressed by an OFDM symbol index and a subcarrier index. A resource block (RB) (or physical resource block (PRB) 107 is defined by $N_{symb}$ consecutive OFDM symbols 101 in the time domain and $N_{RB}$ consecutive subcarriers 110 in the frequency domain. Therefore, one RB 108 includes $N_{symb} \times N_{RB}$ REs 106. In general, the minimum transmission unit of data is the RB. In the LTE system, generally, $N_{symb}=7$ and $N_{RB}=12$. $N_{BW}$ and $N_{RB}$ are proportional to the bandwidth of the system transmission band.

Below, downlink control information (DCI) in the LTE and LTE-A systems will be described in more detail.

In the LTE system, scheduling information of downlink data or uplink data is transmitted from the base station to the terminal through DCI. The DCI may operate through the application of one of various predefined DCI formats depending on whether scheduling information is for uplink data or downlink data, whether the DCI is compact DCI having small size control information, and whether spatial multiplexing using multiple antennas is applied, and the DCI is DCI for controlling power. For example, DCI format 1, which is scheduling information of downlink data, may include the following control information.

Resource allocation type 0/1 flag: notifies whether a resource allocation type is type 0 or type 1. Type 0 applies a bitmap scheme and allocates resources in the unit of resource block groups (RBGs). In the LTE system, a basic scheduling unit is a RB, expressed by time and frequency domain resources, and an RBG includes a plurality of RBs and is used as a basic scheduling unit in type 0. Type 1 allows allocation of predetermined RBs in an RBG.

Resource block assignment: indicates RBs allocated to data transmission. Expressed resources are determined according to the system bandwidth and the resource allocation type.

Modulation and coding scheme (MCS): indicates a modulation scheme used for data transmission and the size of a transport block, which is data to be transmitted.

Hybrid automatic repeat request (HARQ) process number: indicates a process number of HARQ.

New data indicator: indicates HARQ initial transmission or HARQ retransmission.

Redundancy version: indicates a redundancy version of HARQ.

Transmit power control (TPC) command for physical uplink control channel (PUCCH): indicates a transmission power control command for a PUCCH, which is an uplink control channel.

The DCI is transmitted through a physical downlink control channel (PDCCH), which is a downlink physical control channel, via a channel-coding and modulation process.

A cyclic redundancy check (CRC) is added to a DCI message payload and is scrambled to a radio network temporary identifier (RNTI) corresponding to the identity of the terminal. Depending on the purpose of the DCI message, for example, terminal (UE)-specific data transmission, a power control command, or a random access response, different RNTIs are used. RNTI is not explicitly transmitted, but is included in a CRC calculation process. When the DCI message transmitted to the PDCCH is received, the terminal may identify the CRC through the allocated RNTI, and may recognize that the corresponding message is transmitted to the terminal when the CRC is determined to be correct on the basis of the CRC identification result.

Figure 2:
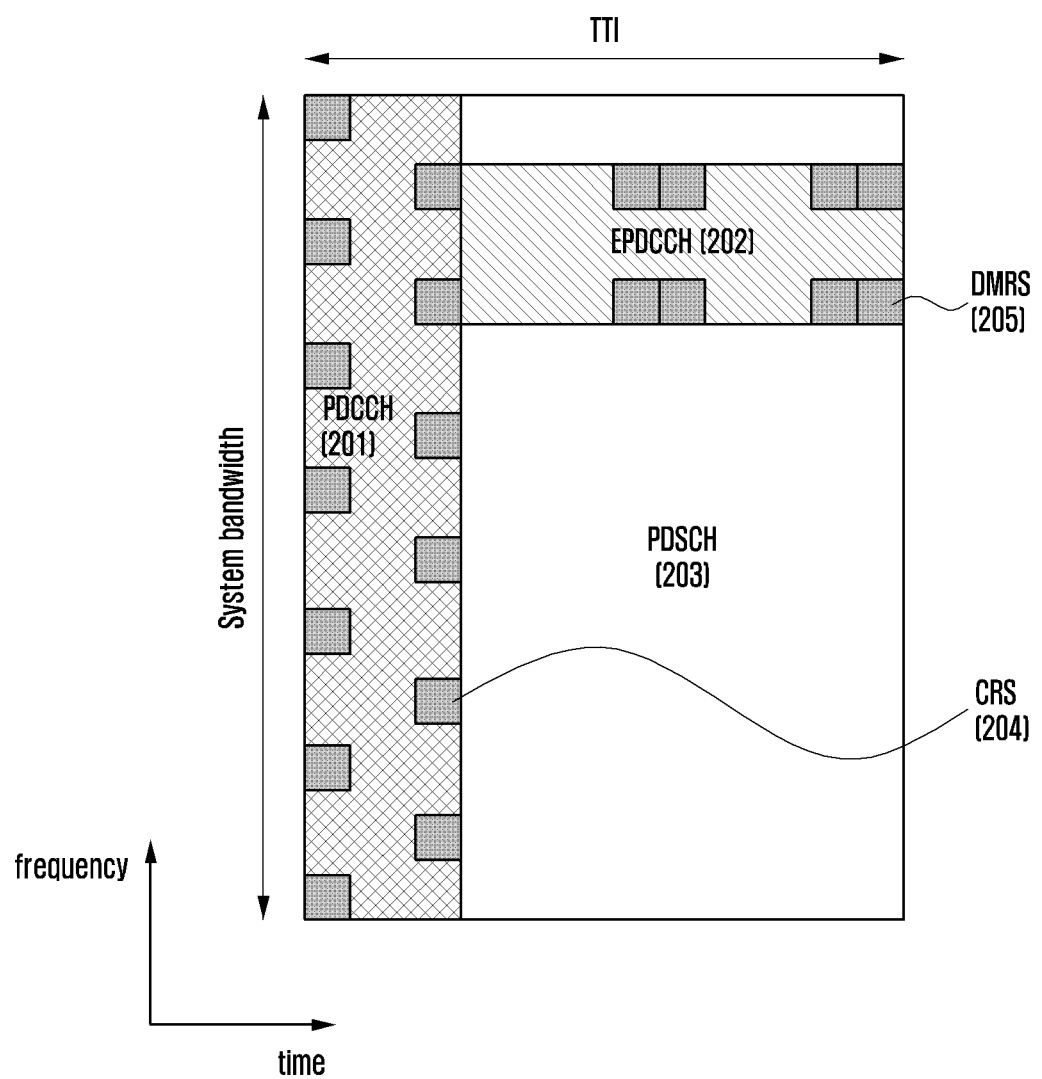
FIG. 2 illustrates downlink physical channels for transmitting downlink control information (DCI) in LTE according to an embodiment of the disclosure.

FIG. 2 illustrates downlink physical channels for transmitting DCI in LTE according to an embodiment of the disclosure.

Referring to FIG. 2, a PDCCH 201 is multiplexed on the time axis with a physical downlink shared channel (PDSCH) 203, which is a data transmission channel, and is transmitted over the entire system bandwidth. A region of the PDCCH 201 is expressed by the number of OFDM symbols, and is indicated to the terminal through a control format indicator (CFI) transmitted through a physical control format indicator channel (PCFICH). By allocating the PDCCH 201 to OFDM symbols on the front part of the subframe, the terminal may decode downlink scheduling allocation as soon as possible, and thus a decoding delay for a downlink shared channel (DL-SCH), that is, an entire downlink transmission delay, may be reduced. One PDCCH carries one DCI message, and a plurality of terminals is simultaneously scheduled on the downlink and the uplink, so that transmission of a plurality of PDCCHs is simultaneously performed within each cell. A common reference signal (CRS) 204 is used as a reference signal for decoding the PDCCH 201. The CRS 204 is transmitted in every subframe over the entire band, and scrambling and resource mapping vary depending on a cell identity (ID). Since the CRS 204 is a reference signal used by all terminals, terminal-specific beamforming cannot be used. Accordingly, a multi-antenna transmission scheme of the PDCCH in LTE is limited to open-loop transmission diversity. The number of ports of the CRS is implicitly made known to the terminal from decoding of a physical broadcast channel (PBCH).

Resource allocation of the PDCCH 201 is based on a control-channel element (CCE), and one CCE consists of 9 resource element groups (REGs), that is, a total of 36 REs. The number of CCEs required for a particular PDCCH 201 may be 1, 2, 4, or 8, which varies depending on a channel coding rate of the DCI message payload. As described above, a different numbers of CCEs may be used to implement link adaptation of the PDCCH 201. The terminal is required to detect a signal while the terminal is not aware of information on the PDCCH 201, so a search space indicating a set of CCEs is defined for blind decoding in LTE. The search space includes a plurality of sets at an aggregation level (AL) of each CCE, which is not explicitly signaled but is implicitly defined through a function using a terminal identity and a subframe number. In each subframe, the terminal performs decoding on the PDCCH 201 with respect to all resource candidates that can be configured by CCEs within the set search space and processes information declared to be valid to the corresponding terminal through identification of the CRC.

The search space is classified into a terminal-specific search space and a common search space. Terminals in a predetermined group, or all terminals, may search for a common search space of the PDCCH 201 in order to receive cell-common control information such as dynamic scheduling of system information or paging messages. For example, scheduling allocation information of the DL-SCH for transmission of system information block (SIB)-1 including service provider information of the cell may be received by searching for the common search space of the PDCCH 201.

Referring to FIG. 2, an enhanced PDCCH (EPDCCH) 202 is multiplexed on the frequency with the PDSCH 203. The base station may appropriately allocate resources of the EPDCCH 202 and the PDSCH 203 through scheduling and accordingly effectively support the coexistence with transmission of data for the existing LTE terminal. However, the EPDCCH 202 is transmitted while being allocated to the entirety of one subframe on the time axis, so that there is a problem in terms of the transmission delay time. A plurality of EPDCCHs 202 constitutes a set of EPDCCHs 202, and allocation of the set of EPDCCHs 202 is performed in units of PRB pairs. Location information of the set of EPDCCHs is set in a terminal-specific manner and is signaled through radio resource control (RRC). Up to two sets of EPDCCHs 202 may be configured in each terminal, and one set of EPDCCHs 202 may be simultaneously multiplexed and configured in different terminals.

Resource allocation of the EPDCCH 202 is based on enhanced CCEs (ECCEs), and one ECCE consists of 4 or 8 enhanced REGs (EREGs), and the number of EREGs per ECCE varies depending on a cyclic prefix (CP) length and subframe configuration information. One EREG consists of 9 REs, and accordingly 16 EREGs may exist per RPB pair. EPDCCH transmission types are classified into localized and distributed transmission types according to the RE mapping scheme of EREGs. The AL of the ECCEs may be 1, 2, 4, 8, 16, or 32, which is determined by a cyclic prefix (CP) length, subframe configuration, an EPDCCH format, and a transmission scheme.

The EPDCCH 202 supports only a terminal-specific search space. Accordingly, the terminal which desires to receive a system message should necessarily search for a common search space on the existing PDCCH 201.

In the EPDCCH 202, a demodulation reference signal (DMRS) 205 is used as a reference signal for decoding. Accordingly, precoding for the EPDCCH 202 may be configured by the base station, and may use terminal-specific beamforming. Although terminals do not know which precoding is used through the DMRS 205, the terminals may perform decoding for the EPDCCH 202. In the EPDCCH 202, the same pattern as the DMRS of the PDSCH 203 is used. However, unlike the PDSCH 203, the DMRS 205 of the EPDCCH 202 may support transmission using a maximum of 4 antenna ports. The DMRS 205 is transmitted only through the corresponding PRB through which the EPDCCH is transmitted.

Port configuration information of the DMRS 205 varies depending on the transmission scheme of the EPDCCH 202. In a localized transmission scheme, an antenna port corresponding to the ECCE to which the EPDCCH 202 is mapped is selected on the basis of a terminal ID. When different terminals share the same ECCE, that is, when multiuser MIMO transmission is used, the DMRS antenna port may be allocated to each terminal. Alternatively, transmission may be performed while sharing the DMRS 205. In this case, the transmission may be identified by a DMRS 205 scrambling sequence configured through higher-layer signaling. In the distributed transmission scheme, up to two antenna ports of the DMRS 205 are supported, and a diversity scheme in a precoder cycling type is supported. All REs transmitted within one PRB pair may share the DMRS 205.

In LTE, the entire PDCCH region includes a set of CCEs in a logical area and there is a search space including the set of CCEs. The search space is classified into a common search space and a terminal-specific search space, and the search space for the LTE PDCCH is defined as follows.

---

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $$L \{(Y_k + m') \bmod \lfloor N_{CCE,k} / L \rfloor\} + i$$

where $Y_k$ is defined below, $i = 0, \ldots, L - 1$. For the common search space $m' = m$. For the PDCCH UE specific search space, for the serving cell on which PDCCH is monitored, if the monitoring UE is configured with carrier indicator field then m' = m + $M^{(L)} \cdot n_{CI}$ where $n_{CI}$ is the carrier indicator field value, else if the monitoring UE is not configured with carrier indicator field then m' = m, where m = 0, . . . , $M^{(L)}$ −1. $M^{(L)}$ is the number of PDCCH candidates to monitor in the given search space.

Note that the carrier indicator field value is the same as ServCellIndex.
For the common search spaces, $Y_k$ is set to 0 for the two aggregation levels L = 4 and L = 8.
For the UE-specific search space $S_k^{(L)}$ at aggregation level L , the variable $Y_k$ is defined by
$Y_k = ( A \cdot Y_{k-1})$ mod D
where $Y_{-1} = n_{RNTI} \neq 0$, A = 39827, D = 65537 and k = $\lfloor n_s/2 \rfloor$,
$n_s$ is the slot number within a radio frame.
The RNTI value used for $n_{RNTI}$ is defined in subclause 7.1 in downlink and subclause 8 in uplink.

According to the definition of the search space for the PDCCH, the terminal-specific search space is not explicitly signaled, but is implicitly defined through a function by a terminal identity and a subframe number. In other words, the terminal-specific search space is changeable according to a subframe number, which means that the terminal-specific search space is changeable according to the time. Thereby, a problem (defined as a blocking problem) in which a particular terminal cannot use a search space due to other terminals is solved. If all CCES for which the terminal searches have already been used by other terminals scheduled within the same subframe and no terminal can be scheduled in the corresponding subframe, the search space is changed according to the time and thus this problem may not occur in the subsequent subframe. For example, even though terminal-specific search spaces of terminal #1 and terminal #2 partially overlap each other in a particular subframe, the terminal-specific search space is changed according to the subframe, and thus it may be expected that overlapping in the subsequent subframe will be different.

According to the definition of the search space for the PDCCH, since terminals in a predetermined group or all terminals should receive the PDCCH, the common search space is defined as a pre-appointed set of CCEs. In other words, the common search space is not changed according to the terminal identity or the subframe number. Although the common search space exists for transmission of various system messages, the common search space may also be used for individual transmission of control information of the terminal. Accordingly, the common search space may be used to solve the problem in which resources available in the terminal-specific search space are insufficient and thus terminals cannot be scheduled.

The search space is a set of candidate control channels including CCEs for which the terminal should attempt decoding at the given AL, and there are several ALs at which a set of CCEs is configured by 1, 2, 4, and 8 CCEs, so that the terminal has a plurality of search spaces. The number of PDCCH candidates which the terminal should monitor within the search space according to the AL in the LTE PDCCH is defined as shown in the following Table 1.

TABLE 1

| | Search space $S_k^{(L)}$ | | | Number of PDCCH candidates $M^{(L)}$ |
|---|---|---|---|---|
| | URLLC | URLLC | URLLC | |
| UE-specific | 1 | 6 | | 6 |
| | 2 | 12 | | 6 |
| | 4 | 8 | | 2 |
| | 8 | 16 | | 2 |

TABLE 1-continued

| | Search space $S_k^{(L)}$ | | | Number of PDCCH candidates $M^{(L)}$ |
|---|---|---|---|---|
| | URLLC | URLLC | URLLC | |
| Common | 4 | 16 | | 4 |
| | 8 | 16 | | 2 |

In Table 1, the terminal-specific search space supports ALs 1, 2, 4, and 8 and has 6, 6, 2, and 2 PDCCH candidates, respectively. The common search space supports ALs 4 and 8 and has 4 and 2 PDCCH candidates, respectively. The reason why the common search space supports only ALs 4 and 8 is that coverage characteristics are generally good when a system message reaches a cell edge.

DCI transmitted to the common search space is defined only for a system message or a particular DCI format, such as 0/1A/3/3A/1C, corresponding to the purpose of power control for a terminal group. Within the common search space, a DCI format having spatial multiplexing is not supported. A downlink DCI format, which should be decoded in the terminal-specific search space, varies depending on the transmission mode configured for the corresponding terminal. Since the configuration of the transmission mode is performed through RRC signaling, a subframe number indicating whether the corresponding configuration is valid for the corresponding terminal is not accurately specified. Accordingly, the terminal may operate to maintain communication by always decoding DCI format 1A regardless of the transmission mode.

The method and the search space for transmitting and receiving the downlink control channel and the DCI in LTE and LTE-A have been described above.

Hereinafter, a downlink control channel in a 5G communication system, which is currently under discussion, will be described in more detail with reference to the drawings.

Figure 3:
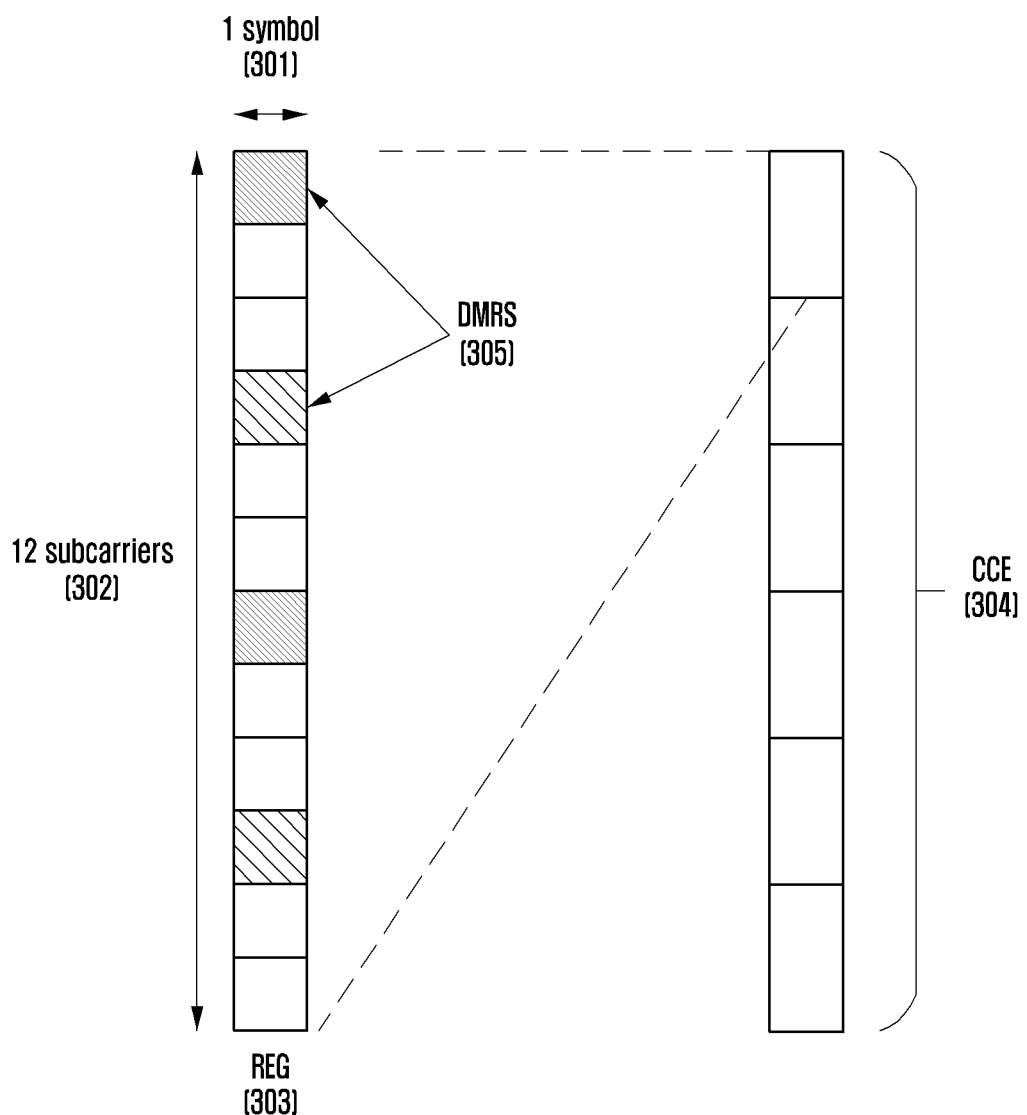
FIG. 3 illustrates transmission resources of a 5th-generation (5G) downlink control channel according to an embodiment of the disclosure.

FIG. 3 illustrates an example of a basic unit of time and frequency resources included in a downlink control channel that can be used in a 5G downlink control channel according to an embodiment of the disclosure.

Referring to FIG. 3, the basis unit (REG) of time and frequency resources included in the control channel consists of 1 OFDM symbol 301 on the time axis and 12 subcarriers 302, that is, 1 RB, on the frequency axis. In the configuration of the basic unit of the control channel, a data channel and a control channel can be multiplexed on the time axis within one subframe on the basis of the assumption that the basic unit on the time axis is 1 OFDM symbol 301. It is easy to satisfy delay time requirements through a decrease in processing time of the user by placing the control channel ahead of the data channel. It is possible to more efficiently perform frequency multiplexing between the control channel and the data channel by configuring the basic unit on the frequency axis of the control channel as 1 subcarrier 302.

By concatenating an REG 303 illustrated in FIG. 3, various sizes of control channel areas may be configured. For example, when a basic unit of allocation of the downlink control channel in 5G is a CCE 304, 1 CCE 304 may consist of a plurality of REGs 303. The REG 303 illustrated in FIG. 3 will be described by way of example. When the REG 303 consists of 12 REs and 1 CCE 304 consists of 6 REGs 303, 1 CCE 304 may consist of 72 REs. When a downlink control region is configured, the corresponding region may include a plurality of CCEs 304, and a particular downlink control channel may be mapped to one or a plurality of CCEs 304 according to an AL within the control region and then transmitted. CCEs 304 within the control region may be distinguished by numbers that may be assigned according to a logical mapping scheme.

The basic unit of the downlink control channel illustrated in FIG. 3, that is, the REG 303, may include all REs to which the DCI is mapped and the region to which a DMRS 305, which is a reference signal for decoding the REs, is mapped. The DMRS 305 may be mapped and transmitted in consideration of the number of antenna ports used for transmitting the downlink control channel. FIG. 3 illustrates an example in which two antenna ports are used. At this time, a DMRS 306 transmitted for antenna port #0 and a DMRS 307 transmitted for antenna port #1 may exist. The DMRSs for different antenna ports may be multiplexed in various ways. FIG. 3 illustrates an example in which DMRSs corresponding to different antenna ports are orthogonal and transmitted in different REs. As described above, the DMRSs may be transmitted in a frequency division multiplexing (FDM) manner or a code division multiplexing (CDM) manner. Further, various DMRS patterns may exist, which is relevant to the number of antenna ports.

Figure 4:
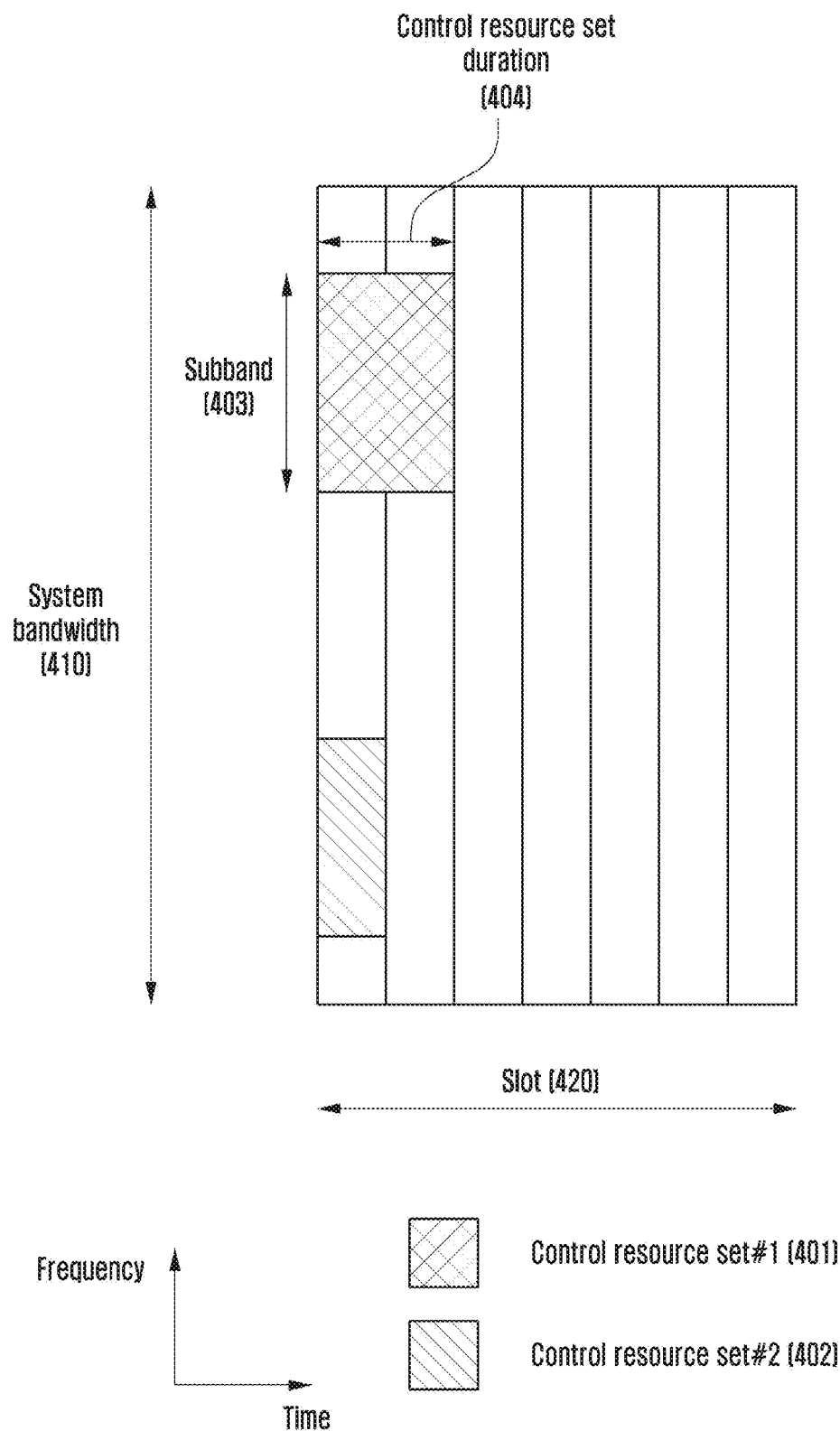
FIG. 4 illustrates an example of a control region in which a downlink control channel is transmitted in a 5G wireless communication system according to an embodiment of the disclosure.

FIG. 4 illustrates an example of a control region in which a downlink control channel is transmitted in a 5G wireless communication system according to an embodiment of the disclosure.

Referring to FIG. 4, an example is illustrated in which two control regions (e.g., control resource set #1 401 and control resource set #2 402) are configured within a system bandwidth 410 on the frequency axis and 1 slot 420 on the time axis, with 1 slot consisting of 7 OFDM symbols in the example of FIG. 4. The control resource sets 401 and 402 may be configured as a particular subband 403 in an entire system bandwidth 410 on the frequency axis. The control resource sets 401 and 402 may be configured as one or a plurality of OFDM symbols on the time axis, which may be defined as a control region length (e.g., control resource set duration 404). In the example of FIG. 4, control resource set #1 401 is configured as a control region length of 2 symbols and control resource set #2 402 is configured as a control region length of 1 symbol.

The control regions in 5G may be configured through higher-layer signaling (for example, system information, a master information block (MIB), or RRC signaling) from the base station to the terminal. From the point of view of the terminal, configuration of the control regions means provision of information such as locations of control regions, subbands, resource allocation of control regions, and lengths of control regions. For example, the information may include the following information of Table 2.

TABLE 2

Configuration information 1. RB allocation information on frequency axis
Configuration information 2. Control region start symbol
Configuration information 3. Control region symbol length
Configuration information 4. REG bundling size
Configuration information 5. Transmission mode (interleaved transmission mode or non-interleaved transmission mode)
Configuration information 6. Search space type (common search space, group- common search space, and terminal-specific search space)
Others Various other information required for transmitting the downlink control channel may be configured in the terminal as well as the above-listed configuration information.

Next, a slot format considered in the 5G communication system will be described.

Figure 5:
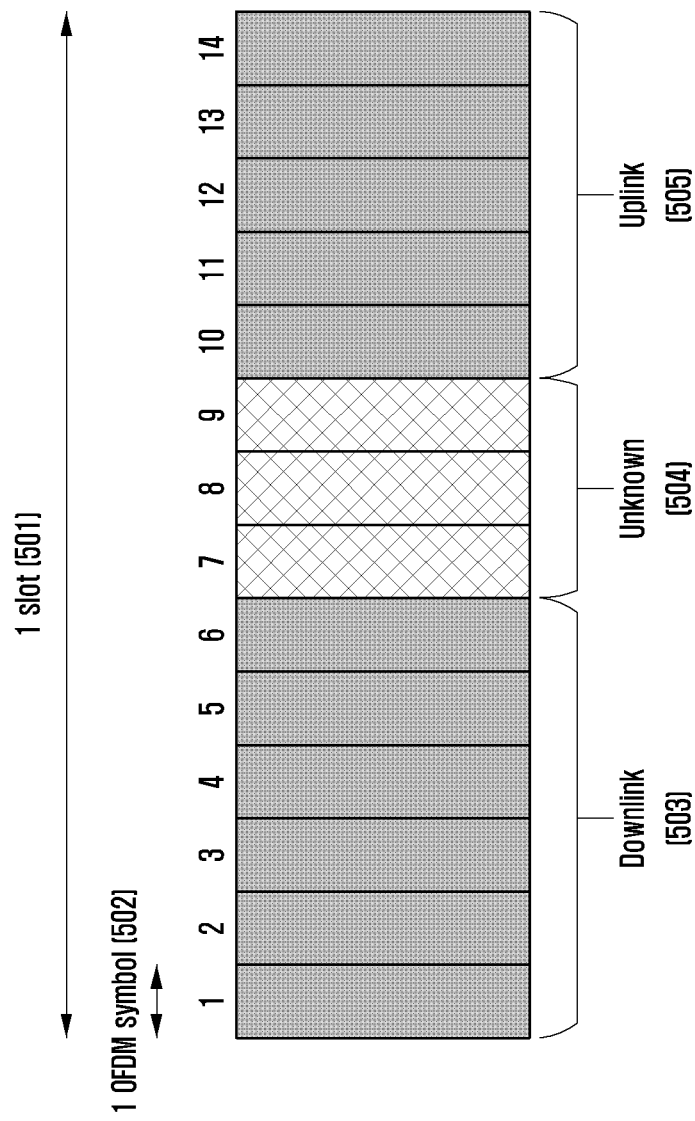
FIG. 5 illustrates an example of a 5G slot format according to an embodiment of the disclosure.

FIG. 5 illustrates an example of a 5G slot format according to an embodiment of the disclosure.

Referring to FIG. 5, in 5G, 1 slot 501 may consist of 14 OFDM symbols 502. Each symbol within the slot may be used as one of a downlink symbol 503, an uplink symbol 505, and an unknown symbol 504. When a symbol is a downlink symbol 503, transmission is from the base station to the terminal, that is, an operation in which the base station performs transmission and the terminal performs reception. When a symbol is an uplink symbol 505, transmission is from the terminal to the base station, that is, an operation in which the terminal performs transmission and the base station performs reception. When a symbol is an unknown symbol 504, there is no transmission/reception between the base station and the terminal occurs in the corresponding symbol. However, the unknown symbol 504 may be overwritten by other DCI, in which case the terminal performs transmission or reception in the unknown symbol 504 as instructed by an indicator of the DCI.

1 slot may consist of a set of downlink, uplink and unknown symbols 503, 505, and 504, and a particular combined format may be called a slot format. That is, each of 14 symbols within the slot may be one of the three symbols, such as the downlink, uplink and unknown symbols 503, 505, and 504, and accordingly the number of all available slot formats may be $3^{14}$.

A slot or a mini slot may be defined to have various slot formats, and may be classified into the following formats.

DL-only slot or full-DL slot: includes only downlink sections and supports only downlink transmission.

DL-centric slot: includes downlink sections, guard period (GP), and uplink sections, and has a larger number of OFDM symbols in the downlink section than in the uplink section.

UL-centric slot: includes downlink sections, GP, and uplink sections, and has a smaller number of OFDM symbols in the downlink section than in the uplink section.

UL-only slot or full-DL slot: includes only uplink sections and supports only uplink transmission.

Although the classification of slot formats has been described above, the mini slot may also be classified through the same classification scheme (a description of slot-based scheduling and mini-slot-based scheduling will be made with reference to FIG. 6). That is, the mini slot may be classified into a DL-only mini slot, a DL-centric mini slot, a UL-centric mini slot, and a UL-only mini slot. In the slot format described above, unknown symbols may be located by implementation of the base station and the slot formats may be signaled to the terminal in different slot formats.

Definition of signaling indicating all available slot formats generates very large overhead, so a method of selecting and operating only some thereof will be proposed. First, a set of slot formats including one or more slot formats to be used by the base station is selected from among all available slot formats, the set is configured in the terminal through a higher layer signal, and the slot format indicated by the slot format indicator (SFI) is transmitted to the terminal. The terminal may receive information indicating a particular slot format among the configured set of slot formats through the SFI by receiving the higher layer signal.

Second, one or more configurations of slot formats in a predetermined time period (for example, 10 ms) are predetermined and transmitted to the terminal through a higher layer signal, and the slot format configuration to be used during the predetermined time period may be transmitted to the terminal through the SFI. The terminal may receive slot format information to be applied during the predetermined time period, among the configured slot format configurations, through the SFI by receiving the higher layer signal.

Referring to FIG. 5, one of the available slot formats is illustrated. FIG. 5 illustrates an example in which first to sixth symbols are downlink symbols 503, seventh to ninth symbols are unknown symbols 504, and tenth to fourteenth symbols are uplink symbols 505 according to an embodiment of the disclosure.

A slot format may be made known to the terminal from the base station through a SFI. The SFI may be transmitted through a group command PDCCH. The group command PDCCH may transmit one or a plurality of SFIs, and a plurality of SFIs may indicate respective slot formats of a plurality of following slots. Alternatively, one SFI may indicate slot format configurations for slots in a predetermined time period (for example, 10 ms) set by a higher layer signal. The base station may configure a higher layer signal such that a terminal monitors the group command PDCCH and the terminal configured to monitor the group command PDCCH through the higher layer signal may monitor the group common PDCCH and acquire the SFI therefrom. The terminal may receive a notification of slot formats of a particular slot or slots during a predetermined time period from the acquired SFI and determine each symbol as one of the downlink, uplink, and unknown symbols 503, 505, and 504 according to the indicated slot format. The predetermined time period may be configured by the higher layer signal.

Next, a method of transmitting a DMRS for decoding a PDSCH considered in the 5G communication system will be described.

Figure 6:
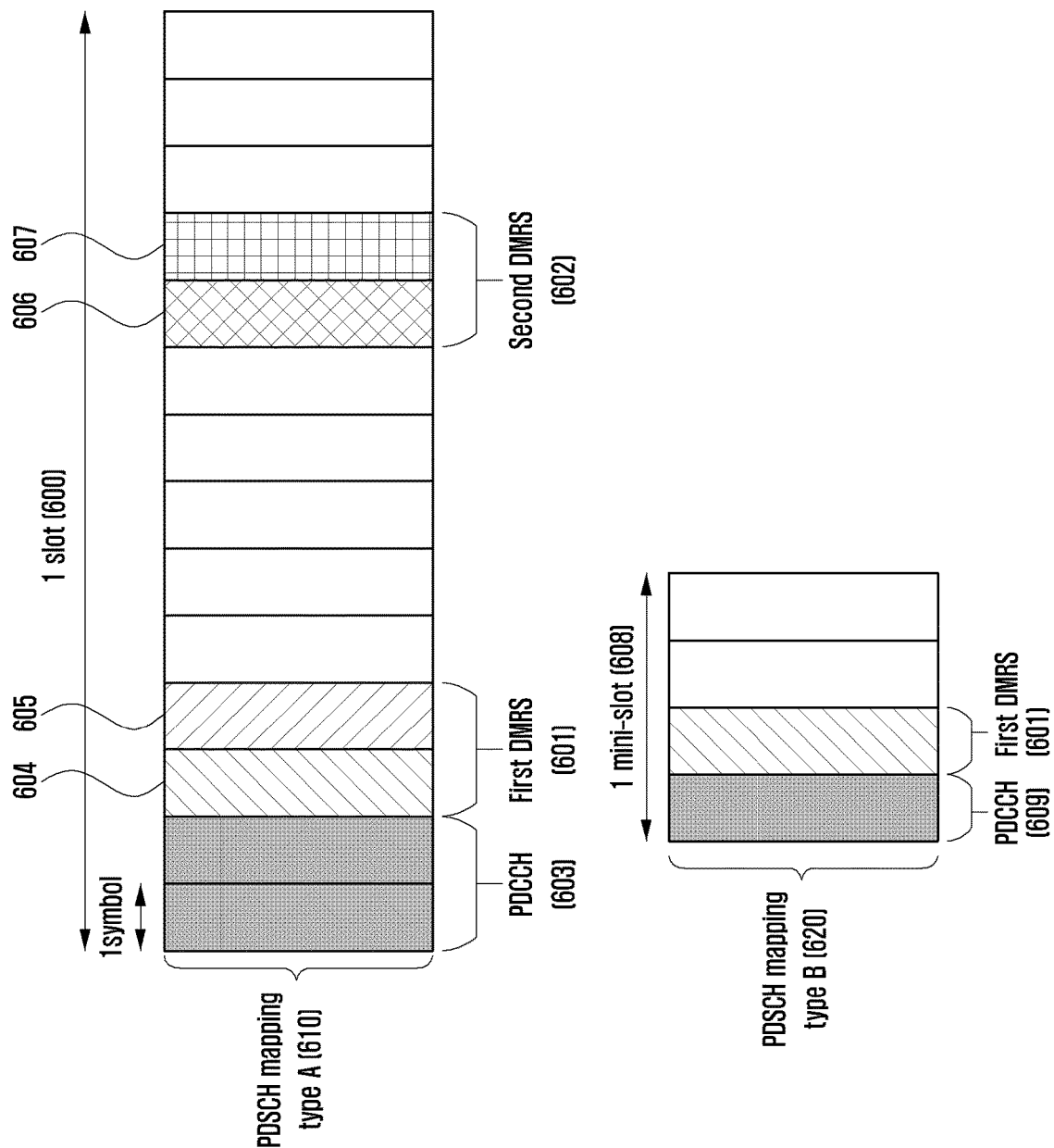
FIG. 6 illustrates a method of transmitting a demodulation reference signal (DMRS) in a 5G communication system according to an embodiment of the disclosure.

FIG. 6 illustrates an example of a method of transmitting the DMRS in a 5G communication system according to an embodiment of the disclosure.

Referring to FIG. 6, the location of the DMRS may be different depending on the mapping type of the PDSCH in the 5G communication system. In FIG. 6, a PDSCH mapping type A 610 may correspond to, for example, slot-based scheduling, and a PDSCH mapping type B 620 may correspond to, for example, non-slot-based or mini-slot-based scheduling. Slot-based scheduling may correspond to a scheme in which the PDSCH is scheduled over 1 slot 600, and non-slot-based or mini-slot-based scheduling may correspond to a scheme in which the PDSCH is scheduled over a mini slot 608 consisting of a particular number of symbols and a PDCCH 609.

Referring to FIG. 6, the 5G communication system supports two DMRSs, that is, a first DMRS 601 (also referred to as a front-loaded DMRS) and a second DMRS 602 (also referred to as an additional DMRS). The first DMRS 601 can perform fast channel estimation in decoding the PDSCH and thus has been introduced in 5G in order to reduce a processing time. The second DMRS 602 has been introduced in 5G for the purpose of increasing channel estimation performance in the terminal moving at a high speed and compensating for and tracking phase distortion. At least the first DMRS 601 may be transmitted to decode the PDSCH, and the second DMRS 602 may be additionally transmitted according to the configuration of the base station. The second DMRS 602 may be repeatedly transmitted in the same pattern as the first DMRS 601. The location of a symbol for transmitting the first DMRS 601 may be different depending on the mapping type of the PDSCH. In the case of a PDSCH mapping type A 610, the first DMRS 601 may be transmitted in a third OFDM symbol (or a fourth OFDM symbol). In the case of PDSCH mapping type B 620, the first DMRS 601 may be transmitted in a first OFDM symbol of resources in which the PDSCH is scheduled. The location of a symbol in which the second DMRS 602 is transmitted is still under discussion, and, for example, may be transmitted in a fixed OFDM symbol, configured by the base station, or indicated to the terminal through DCI.

The 5G communication system supports two types of DMRS, and the number of supported ports and a DMRS transmission pattern are different depending on the DMRS type. In the case of DMRS type 1, up to 4 ports can be supported when the DMRS is transmitted in 1 OFDM symbol, and up to 8 ports can be supported when the DMRS is transmitted in 2 OFDM symbols. In the case of DMRS type 2, up to 6 ports can be supported when the DMRS is transmitted in 1 OFDM symbol, and up to 12 ports can be supported when the DMRS is transmitted in 2 OFDM symbols. That is, the maximum number of supportable DMRS ports may vary depending on the number of OFDM symbols in which the DMRS is transmitted.

FIG. 6 illustrates an example in which the first DMRS 601 is transmitted in a third OFDM symbol 604 and a fourth OFDM symbol 605 and the second DMRS 602 is transmitted in a tenth OFDM symbol 606 and an eleventh OFDM symbol 607 in the case of PDSCH mapping type A. Accordingly, the terminal may determine whether the scheduling is slot-based scheduling or mini-slot-based scheduling through the DMRS location. That is, the first DMRS 601 may be transmitted in the third OFDM symbol (or the fourth OFDM symbol) in the case of slot-based scheduling and the first DMRS 601 may be transmitted in the first OFDM symbol of resources in which the PDSCH is scheduled in the case of mini-slot-based scheduling. In another example, the terminal may determine whether the scheduling is slot-based scheduling or mini-slot-based scheduling by receiving a higher layer signal or a dynamic signal including a particular bit field indicating whether the scheduling is slot-based scheduling or mini-slot-based scheduling.

Hereinafter, a method of configuring a bandwidth part considered in the 5G communication system will be described.

Figure 7:
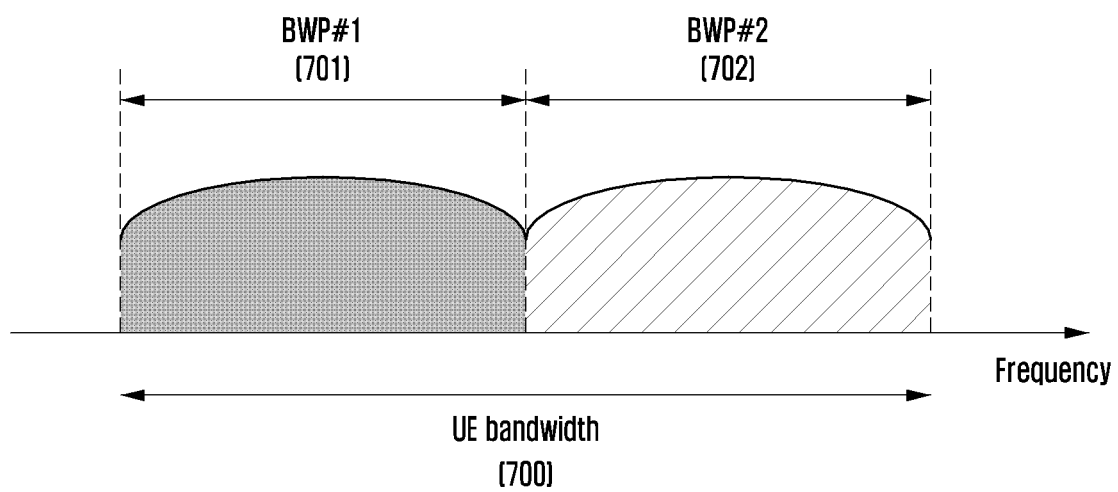
FIG. 7 illustrates an example of configuration of a bandwidth part in a 5G communication system according to an embodiment of the disclosure.

FIG. 7 illustrates an example of configuring a bandwidth part in a 5G communication system according to an embodiment of the disclosure.

Referring to FIG. 7, a terminal (i.e., a UE) bandwidth 700 (i.e., a terminal bandwidth) is configured as bandwidth part #1 701 and bandwidth part #2 702. The base station may configure one or a plurality of bandwidth parts in the terminal, and may configure the following information of Table 3 on each bandwidth part.

TABLE 3

Configuration information 1. Bandwidth of bandwidth part (number of PRBs included in bandwidth part)
Configuration information 2. Frequency location of bandwidth part (offset value compared to reference point (A reference point). Reference point may be a central frequency of a carrier, synchronization signal, or raster synchronization signal)
Configuration information 3. Numerology of bandwidth part (for example, subcarrier, interval, CP, and length)
Others Various parameters associated with the bandwidth part may also be configured in the terminal. The information may be transferred from the base station to the terminal through higher-layer signaling, for example, RRC signaling. Among the one or plurality of configured bandwidth parts, at least one bandwidth part may be activated. Information indicating whether to activate the configured bandwidth parts may be transferred to the terminal from the base station through RRC signaling, or may be dynamically transferred through a media access control (MAC) control element (CE) or DCI.

The configuration of the bandwidth part supported by 5G may be used for various purposes.

For example, when the bandwidth supported by the terminal is smaller than the system bandwidth, the terminal may be supported through the configuration of the bandwidth part. For example, by configuring the frequency location (configuration information 2) of the bandwidth part in Table 3 in the terminal, the terminal may transmit and receive data at a particular frequency location within the system bandwidth.

In another example, the base station may configure a plurality of bandwidth parts in the terminal for the purpose of supporting different numerologies. For example, in order to support data transmission/reception using both subcarrier spacing of 15 kHz and subcarrier spacing of 30 kHz to any terminal, two bandwidth parts may be configured as the subcarrier spacing of 15 kHz and 30 kHz, respectively. Different bandwidth parts may be frequency-division-multiplexed, and when data is transmitted/received at particular subcarrier spacing, the bandwidth part configured as the corresponding subcarrier spacing may be activated.

In another example, the base station may configure bandwidth parts having different size bandwidths in the terminal for the purpose of reducing the power consumption of the terminal. For example, when the terminal supports a very large bandwidth, for example, a bandwidth of 100 MHz, and always transmits/receives data through the corresponding bandwidth, very high power consumption may result. Particularly, monitoring an unnecessary downlink control channel through a large bandwidth of 100 MHz in the state in which there is no traffic is inefficient from the aspect of power consumption. The base station may configure a bandwidth part of the relatively smaller bandwidth, for example, the bandwidth part of 20 MHz, in the terminal for the purpose of reducing power consumption of the terminal. The terminal may perform a monitoring operation in the bandwidth part 20 MHz in the state in which there is no traffic, and when data is generated, may transmit/receive data through the bandwidth part of 100 MHz according to an instruction from the base station.

The disclosure relates to a method and an apparatus for transmitting/receiving a group downlink control channel in a wireless communication system.

As described above, 5G may support both the PDSCH mapping type A (or slot-based scheduling) and the PDSCH mapping type B (or non-slot-based scheduling). At this time, the location of the DMRS transmitted to decode the PDSCH varies depending on whether the scheduling is slot-based scheduling or non-slot-based scheduling. Accordingly, information indicating whether the scheduling is slot-based scheduling or non-slot-based scheduling should be first shared between the base station and the terminal. The disclosure proposes a method by which the base station notifies the terminal of whether the scheduling is slot-based scheduling or non-slot-based scheduling and operation of the terminal according thereto.

As described above, the SFI may be transmitted to the group common PDCCH in 5G. At this time, the base station may additionally indicate what the unknown symbols, i.e. symbols other than symbols corresponding to the downlink and the uplink, will be used for to the terminal through additional DCI. The terminal may use unknown symbols for a particular purpose according to an indicator received from the base station. The disclosure proposes additional signaling to use the unknown symbols for measuring a downlink, an uplink, and a gap and defines operations of the base station and the terminal according thereto.

In 5G, particular time/frequency resources may be configured as resources that are reserved for various purposes. The base station and the terminal may not perform transmission/reception using the resources configured as the reserved resources. The reserved resources may be used, for example, to guarantee compatibility, and predetermined time and frequency resources may be configured to have the highest priority under the determination of the base station. When some of the control regions (i.e., control resource sets) configured to transmit the downlink control channel are configured as reserved resources, the disclosure proposes a method by which the base station transmits DCI and a method of monitoring the control region of the terminal.

Hereinafter, embodiments of the disclosure will be described in detail with reference to the accompanying drawings. The LTE or LTE-A system will be described by way of example in the following embodiments of the disclosure, but the embodiments of the disclosure can also be applied to other communication systems having a similar technical background or channel form. For example, 5G mobile communication technology (5G, new radio, and NR), developed after LTE-A, may be included therein. Accordingly, embodiments of the disclosure may be modified without departing from the scope of the disclosure, and may be applied to other communication systems based on a determination by those skilled in the art.

Further, in the following description of the disclosure, a detailed description of known functions and configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Further, individual embodiment of the disclosure or a combination thereof may be applied to the base station and the terminal.

First Embodiment

Figure 8:
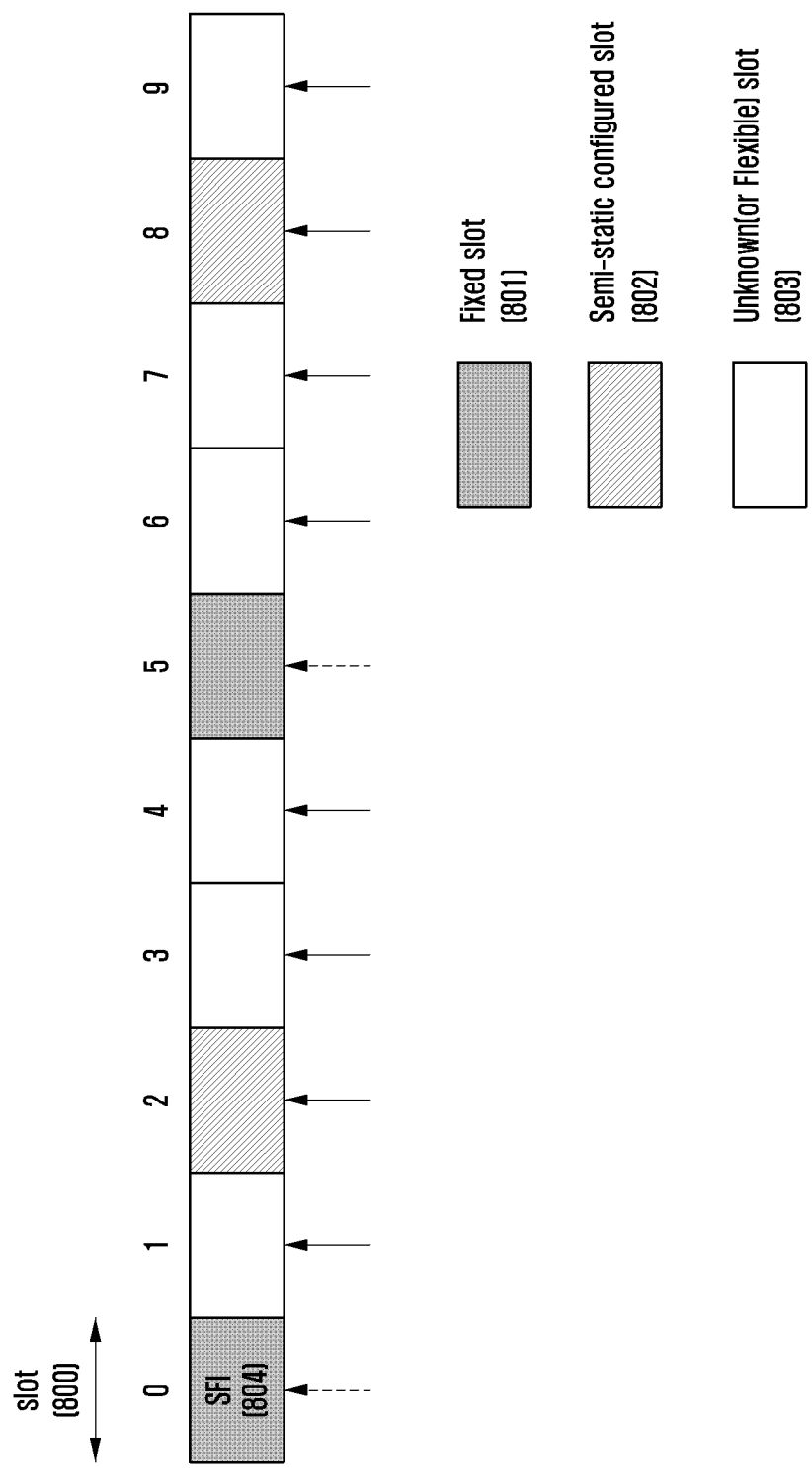
FIG. 8 illustrates an example SFI period of 10 slots according to an embodiment of the disclosure.

FIG. 8 illustrates an example SFI period of 10 slots according to an embodiment of the disclosure.

Referring to FIG. 8, it is assumed that a transmission period of an SFI corresponds to 10 slots and that a transmission offset is transmitted every 0th slot. The transmission period of the SFI and the transmission offset may be configured by a higher layer signal. Alternatively, monitoring of the SFI 804 by the terminal in the slot format fixed to the downlink symbol to receive the downlink signal or in the semi-static slot configured as the downlink symbol to receive the downlink signal may be determined by the standard.

As described above, any slot may have a fixed slot format 801. The slot format of the fixed slot 801 may not be changed by additional configuration of the base station, and may be fixed to a particular slot format at an arrangement time (or a slot index) between the base station and the terminal. Alternatively, the location of fixed slot format information and slot format information may be received by the terminal through system information or a terminal-common higher layer signal. In the example of FIG. 8, a zeroth slot and a fifth slot are defined as the fixed slots 801. The reason to support the fixed slot 801 is to periodically transmit signals regardless of the slot format within the system. For example, a synchronization signal block (SSB) may always be periodically transmitted within the system, and to this end a slot format of a slot for transmitting the SSB may be fixedly defined. Further, a slot format of a slot may be fixedly defined to an uplink symbol in order to allow the terminal to transmit a random preamble for random access. The fixed slot may be defined to have one or more fixed downlink OFDM symbols or uplink OFDM symbols. In this case, it is assumed by the terminal that the fixed downlink OFDM symbols or uplink OFDM symbols are not changed (overwritten) by a terminal higher layer signal and that the remaining OFDM symbols other than the fixed OFDM symbols within one slot may be changed to downlink OFDM symbols, uplink OFDM symbols, or unknown symbols by a terminal-dedicated higher layer signal or an SFI. Alternatively, the fixed slot may be defined such that all symbols within one slot have fixed downlink OFDM symbols or uplink OFDM symbols. In this case, it is assumed by the terminal that the fixed downlink OFDM symbols or uplink OFDM symbols are not changed by the terminal-dedicated higher layer signal or the SFI.

Any slot may have a semi-statically configured slot format 802. The base station may configure a slot format of a particular slot through higher-layer signaling (for example, terminal-common system information (SI) or terminal-dedicated RRC signaling), and the terminal may receive the corresponding configuration information. In the example of FIG. 8, a second slot and an eighth slot are semi-statically configured slots 802.

Any slot may have a slot format dynamically configured by the SFI as indicated by reference numeral 803. A slot of which the slot format can be dynamically changed may be referred to as a dynamic slot, an unknown slot, or a flexible slot, and is called an unknown slot 803 in the disclosure. The base station may determine which slot is used as the unknown slot 803 and may notify the terminal of the corresponding configuration information through higher-layer signaling (for example, terminal-common SI or terminal-dedicated RRC signaling) or the SFI. In the example of FIG. 8, first, third, fourth, sixth, seventh, and ninth slots correspond to unknown slots 803.

Slot formats such as the DL-only slot, the UL-only slot, the DL-centric slot, and the UL-centric slot including the unknown slot 803 may be additionally indicated from the base station to the terminal by the SFI, and the SFI may be transmitted to the terminal through group common DCI.

The base station may configure the terminal to monitor group common DCI in the fixed slot 803 or the semi-static slot 802 including downlink symbols through higher-layer signaling (for example, RRC signaling or MAC CE signaling). For example, when it is assumed that the group common DCI for transmitting the SFI is scrambled with a particular RNTI, for example, an SFI-RNTI, the base station may configure the terminal to monitor the group common DCI configured as the SFI-RNTI and the terminal may receive the configuration information through a higher layer signal. At this time, the SFI may indicate slot format information of one or a plurality of slots. For example, the slot format indicated by the SFI may indicate information on the corresponding slot for transmitting the SFI, or the slot format indicated by the SFI may indicate slot format information of a plurality of slots after the corresponding slot for transmitting the SFI is included. Alternatively, the SFI may indicate slot format information indicating how the slot format indicated by the SFI is changed for the semi-static slot, the unknown slot, and UL/DL-only/centric slots, other than the fixed slot. In FIG. 8, it is assumed that slot format information of the SFI transmitted in the zeroth slot is applied to the remaining slots (solid-line arrows) other than the fixed slots (dotted-line arrows). When one slot format consists of 3 bits, the SFI includes slot format information of a total of 24 bits in this example is applied only to the slots indicated by the solid-line arrows in FIG. 8. When an SFI transmission period corresponds to 10 slots, the standard may be determined such that 24-bit slot format information+ zero padding 6 bits=30-bit information is always transmitted. At this time, the terminal may perform decoding under the assumption of the 30-bit SFI, and may receive information on the slot format of the first 24 bits or remaining slot formats except for 6 bits at the location of fixed slots. Alternatively, the terminal may perform decoding under the assumption of only SFI including 24-bit slot format information, and may apply slot format information to the remaining slots except for the fixed slots indicated by a higher layer signal. Synchronization blocks for transmitting the synchronization signal and the PBCH are transmitted in the fixed slots, and the transmission period of the synchronization blocks may be longer than the transmission period of the SFI. In this case, when the transmission period of the SFI corresponds to 10 slots (10 slots in 15 kHz is 10 ms and is referred to as 1 radio frame), the number of fixed slots in a radio frame including transmission of synchronization blocks and the number of fixed slots in a radio frame which does not include transmission of synchronization blocks may be different from each other. Accordingly, the bit size of the SFI in every radio frame may be determined by the terminal on the basis of higher configuration information of the SFI, and the transmission period of the synchronization block defined in the standard and the terminal may monitor the SFI under the assumption that the bit sizes of the SFI are different in respective radio frames.

Alternatively, slot format information indicating how the slot format indicated by the SFI is changed for the semi-static slot, the unknown slot, and the DL/UL-only/centric slots, including the fixed slot. When the slot format information indicated by the SFI includes changed slot format information of the fixed slot, the terminal assumes that the number of uplink/downlink OFDM symbols is not reduced in the fixed slot indicated by a terminal-common higher layer signal, and when the SFI indicates a reduction in the number of symbols, maintains the fixed slot information indicated by the terminal-common higher layer signal of the related art. In FIG. 8, it is assumed that slot format information of the SFI transmitted in the zeroth slot is applied to all slots including the fixed slots, which are indicated by the dotted-line arrows. When one slot format consists of 3 bits, the SFI includes slot formation information of a total of 30 bits in the example applied to the slots indicated by the solid-line and dotted-line arrows in FIG. 8. When the SFI transmission period corresponds to 10 slots, the standard may be determined such that 30-bit slot format information is always transmitted.

Slot format information of how many slots are indicated by the SFI may be made known to the terminal by the base station through higher-layer signaling (for example, RRC signaling or MAC CE signaling). Indication information of slot format information indicating which slot is indicated by the SFI may be determined by the standard and made known through higher-layer signaling. The terminal may receive the higher-layer signaling and receive configuration of information on the number of slots included in slot formation information and information indicating which slot receives the application. The terminal may monitor group common DCI for transmitting the SFI according to the configuration by the base station and acquire slot formation information of one or a plurality of slots from the acquired SFI.

Although it is assumed that the SFI applied to cell 1 is transmitted in the slot of cell 1 in FIG. 8, the SFI applied to cell 1 may be transmitted in the slot of cell 2, which is a different cell, which will be described below. The configuration information such as the SFI transmission period, the offset, and the application format information included in the higher-layer signaling may be received by the terminal through higher-layer signaling transmitted in cell 2 or cell 1. In addition, cell index information of a cell in which the SFI applied to cell 1 is transmitted should be transmitted through the higher-layer signal. The terminal may monitor the slot of cell 2 while being aware that the SFI applied to cell 1 is transmitted to the slot of cell 2, which is a different cell, on the basis of the cell index information. Further, the terminal should receive information indicating that the SFI received in the slot of cell 2 in the higher configuration is applied to the slot format of cell 1. In order to transmit cell index information to which the SFI is applied, the following method can be used. First, an applied cell index is identified through the transmission period and the offset in which the SFI is transmitted. That is, through different transmission periods and offsets, different cell indexes may be mapped. Second, different RNTIs are mapped for different cells. Third, different search spaces are mapped for respective cells. Fourth, the cell index is inserted into the SFI and the terminal determines which cell is indicated by the cell index through the configuration of the higher layer signal.

Second Embodiment

As described above, one slot may consist of a set of downlink, uplink and unknown symbols and a particular combined format may be called a slot format. A symbol indicated as an unknown symbol may be overridden by other DCI that the base station transmits to the terminal. The symbol overridden by the DCI may mean that the symbol defined as the unknown symbol by the DCI may be used for a particular purpose (for example, downlink, uplink, gap, and measurement purposes) according to the content indicated by the DCI. The gap may refer to a switching time required when the terminal desires to change the operation from downlink reception to uplink transmission. The measurement may refer to an operation performed by the terminal for measuring a channel (for example, measuring channel state information (CSI), etc.) or measuring power (e.g., reference signal received power (RSRP), reference signal received quality (RSRQ), reference signal strength indicator (RSSI), etc.). As described in further detail below, another embodiment of the disclosure proposes a method of operating an unknown symbol indicated by an SFI.

Figure 9:
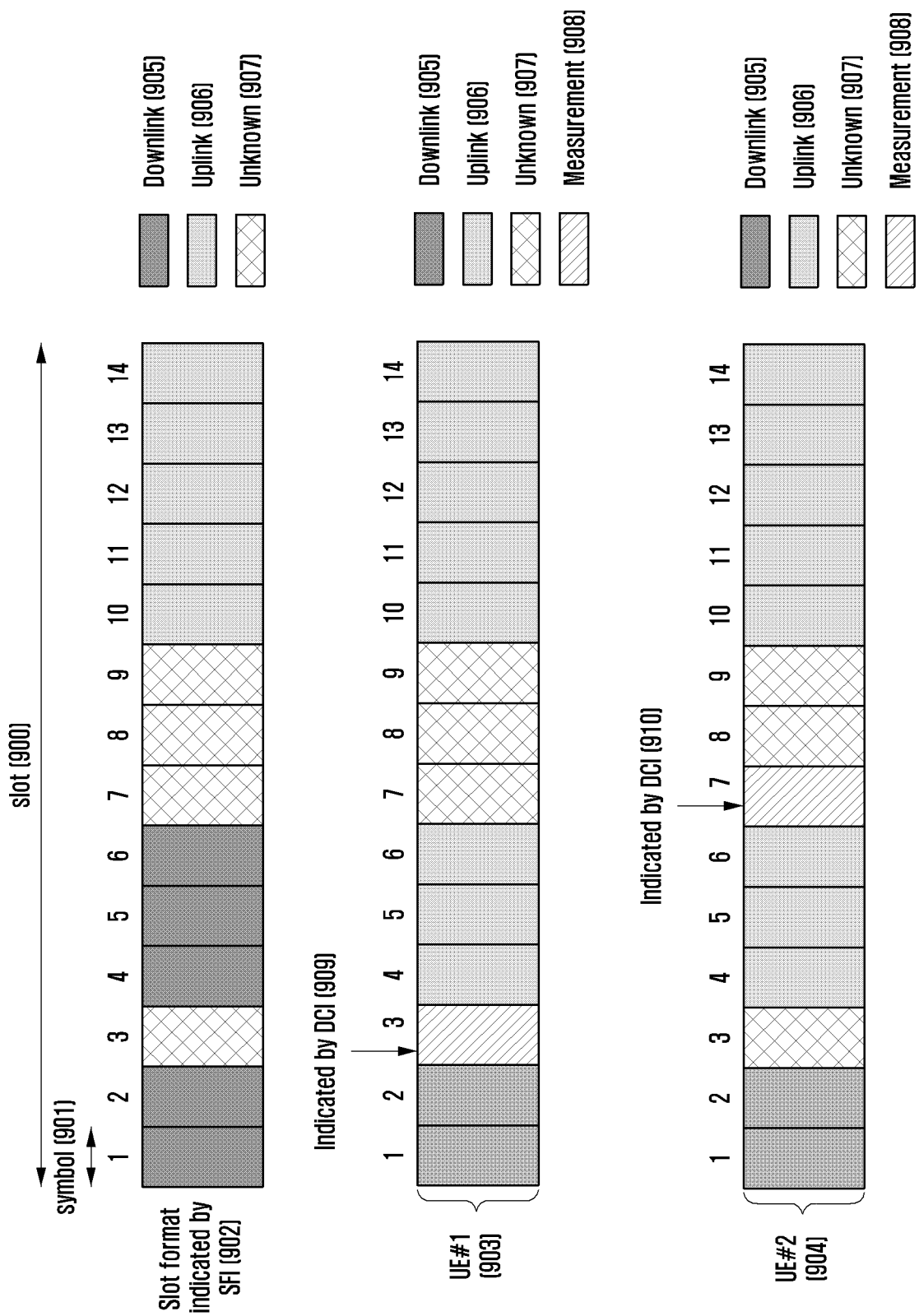
FIG. 9 illustrates an example SFI period of 14 slots according to an embodiment of the disclosure.

FIG. 9 illustrates an example SFI period of 14 slots according to an embodiment of the disclosure.

Referring to FIG. 9, slot 900 is illustrated and may consist of 14 OFDM symbols 901.

The base station may transmit an SFI to the terminal through group common DCI, and the terminal may acquire slot format information of the corresponding slot from the received SFI. That is, any slot may include a particular combination of downlink symbols 905, uplink symbols 906, and unknown symbols 907. FIG. 9 illustrates an example of a slot format 902 indicated by the SFI, where first, second, fourth, fifth, and sixth symbols are downlink symbols 905, tenth, eleventh, twelfth, thirteenth, and fourteenth symbols are uplink symbols 906, and third, seventh, eighth, and ninth symbols are unknown symbols 907. A particular terminal group receiving the same group common DCI may acquire the same SFI information, and accordingly may understand that the corresponding slot has the same slot format.

The base station may additionally transmit an indicator, indicating what an unknown symbol 907 is used for, to the terminal. More specifically, the base station may indicate that the unknown symbol 907 indicated by the SFI will be used for one of downlink, uplink, gap, and measurement purposes to the terminal through terminal-specific DCI.

Hereinafter, a method of using the unknown symbol 907 for the purpose of measurement 908 will be described in detail. This may be equally applied to other purposes, that is, the downlink, the uplink, and the gap.

The base station may instruct the terminal to perform measurement in the unknown symbol 907 through terminal-specific DCI. In the example of FIG. 9, the base station may instruct UE #1 903 to perform measurement 908 in the third OFDM symbol, indicated as the unknown symbol 907, through terminal-specific DCI, as indicated by reference numeral 909. Further, the base station may instruct UE #2 904 to perform measurement 908 in the seventh OFDM symbol, indicated as the unknown symbol 907, through terminal-specific DCI, as indicated by reference numeral 910.

The base station may indicate which symbols, among one or a plurality of unknown symbols 907 indicated by the SFIs, are used for the measurement 908 through N bits (N≥1) of terminal-specific DCI.

For example, the base station may instruct the terminal to perform the measurement 908 on all symbols configured as unknown symbols 907 through N=1 bit. That is, in the state in which third, seventh, eighth, and ninth symbols are indicated as unknown symbols 907 in the example of FIG. 9, the base station may indicate whether to perform the measurement 908 in all symbols corresponding to the unknown symbols 907, that is, the third, seventh, eighth, and ninth symbols, through the 1-bit indicator.

In another example, the base station may group the symbols configured as the unknown symbols 907 in the terminal through N≥1 bits into particular units (one or a plurality of symbols) and may then indicate the unknown symbol group in which the measurement 908 is performed. When the total number of unknown symbols is M and whether to perform measurement is indicated by N bits, the M unknown symbols may be grouped into N unknown symbol groups and ceil (M/N) unknown symbols may be grouped in each unknown symbol group. The base station may indicate whether the corresponding terminal should perform the measurement 908 in any unknown symbol group among the N unknown symbol groups through an N-bit bitmap.

This will be described in detail with reference to FIG. 9. In FIG. 9, it is assumed that a total of M=4 OFDM symbols, that is, third, seventh, eighth, and ninth OFDM symbols, corresponds to unknown symbols and whether to perform measurement is indicated by N=2 bits. In this case, all unknown symbol sets may be grouped into a total of N=2 unknown symbol groups. For example, the unknown symbol sets may be grouped into unknown symbol group #1={third symbol, seventh symbol} and unknown symbol group #2={eighth symbol, ninth symbol}. The base station may indicate the unknown symbol group in which the measurement 908 will be performed among unknown symbol group #1 and unknown symbol group #2 to the terminal through a bitmap indicator of N=2 bits. This may be shown as the following Table 4.

TABLE 4

| Indicator | Explain |
|---|---|
| 00 | No measurement |
| 01 | Measurement in unknown symbol group #1 |
| 10 | Measurement in unknown symbol group #2 |
| 11 | Measurement in unknown symbol group #1 and unknown symbol group #2 |

The size of the indicator indicating the measurement 908 in the unknown symbols 907, that is, N, may be configured through higher-layer signaling (for example, RRC signaling), may use a fixed value, or may be implicitly determined by the number of symbols corresponding to the unknown symbols 907. For example, when the number of unknown symbols 907 is M, it is assumed that N=ceil(M/K)(K≥1) bits.

When the number of unknown symbols 907 is 0, the base station may not transmit the indicator indicating whether to perform the measurement 908 in the unknown symbols 907.

The terminal may acquire SFI information from group common DCI transmitted by the base station. The terminal may determine a slot format of the corresponding slot from the acquired SFI. The terminal may receive the indication indicating whether to perform the measurement 908 in the unknown symbols 907 from the terminal-specific DCI transmitted by the base station in the same way as described above. When the terminal receives an indicator indicating the measurement 908 in a particular unknown symbol 907, the terminal may perform the measurement in the corresponding unknown symbol 907 through a channel measurement (for example, CSI) or power measurement (for example, RSRP, RSRQ, or RSSI) operation or various other ways.

Third Embodiment

Referring back to FIG. 6, slot-based scheduling and non-slot-based scheduling or mini-slot-based scheduling may coexist within one cell and the slot-based scheduling and the non-slot-based scheduling or the mini-slot-based scheduling may be simultaneously indicated, or one selected therefrom may be indicated, to the terminal through a higher layer signal or a dynamic signal.

Although the SFI indicating the slot formats under the assumption of the slot-based scheduling has been mainly described in connection with FIG. 8, the method of FIG. 8 may be applied to the SFI indicating the mini slot formats under the assumption of the non-slot-based scheduling or the mini-slot-based scheduling.

A method of applying a slot-based SFI and a mini-slot-based SFI will be described in the third embodiment.

First, when the terminal simultaneously supports slot-based scheduling and mini-slot-based scheduling, the terminal may receive both higher configuration for activating slot-based scheduling and higher configuration for activating mini-slot-based scheduling, and at this time, may receive both higher configuration for an SFI indicating a slot format based on slot-based scheduling and higher configuration for an SFI indicating a mini slot format based on mini-slot-based scheduling, as illustrated in FIG. 8. The terminal may receive a dynamic signal indicating slot-based scheduling or mini-slot-based scheduling and determine whether to apply the SFI indicating the slot format during a time period (slot format SFI period) of the higher configuration or the SFI indicating the mini slot format during a time period (mini slot format SFI period) of the higher configuration.

Second, when the terminal simultaneously supports slot-based scheduling and mini-slot-based scheduling, the base station may define a slot format set that defines one or more slot formats and a mini slot format set that defines one or more mini slot formats, and may transmit one of the slot format sets and the mini slot format sets to the terminal through a higher layer signal. The terminal receiving the higher layer signal may determine whether to apply the SFI indicating slot format information to the slots illustrated in FIG. 8 or apply the SFI indicating mini slot format information to the mini slots illustrated in FIG. 8 on the basis of whether the terminal receives configuration for the slot format set or configuration for the mini slot format set.

Fourth Embodiment

When the base station and the terminal simultaneously support different numerology (for example, subcarrier spacing) within one cell, the terminal may receive configuration of subcarrier spacing of SFI, which is a reference within the cell, from the base station through a higher layer signal. For example, the terminal may receive the configuration of the reference SFI indicating slot formats of slots of 14 OFDM symbols (1 ms) having subcarrier spacing of 15 kHz from the base station, and may apply the reference SFI to slot formats of 2 slots of 28 OFDM symbols (1 ms) having subcarrier spacing of 30 kHz, different from the subcarrier spacing of 15 kHz, within the cell.

Figure 10:
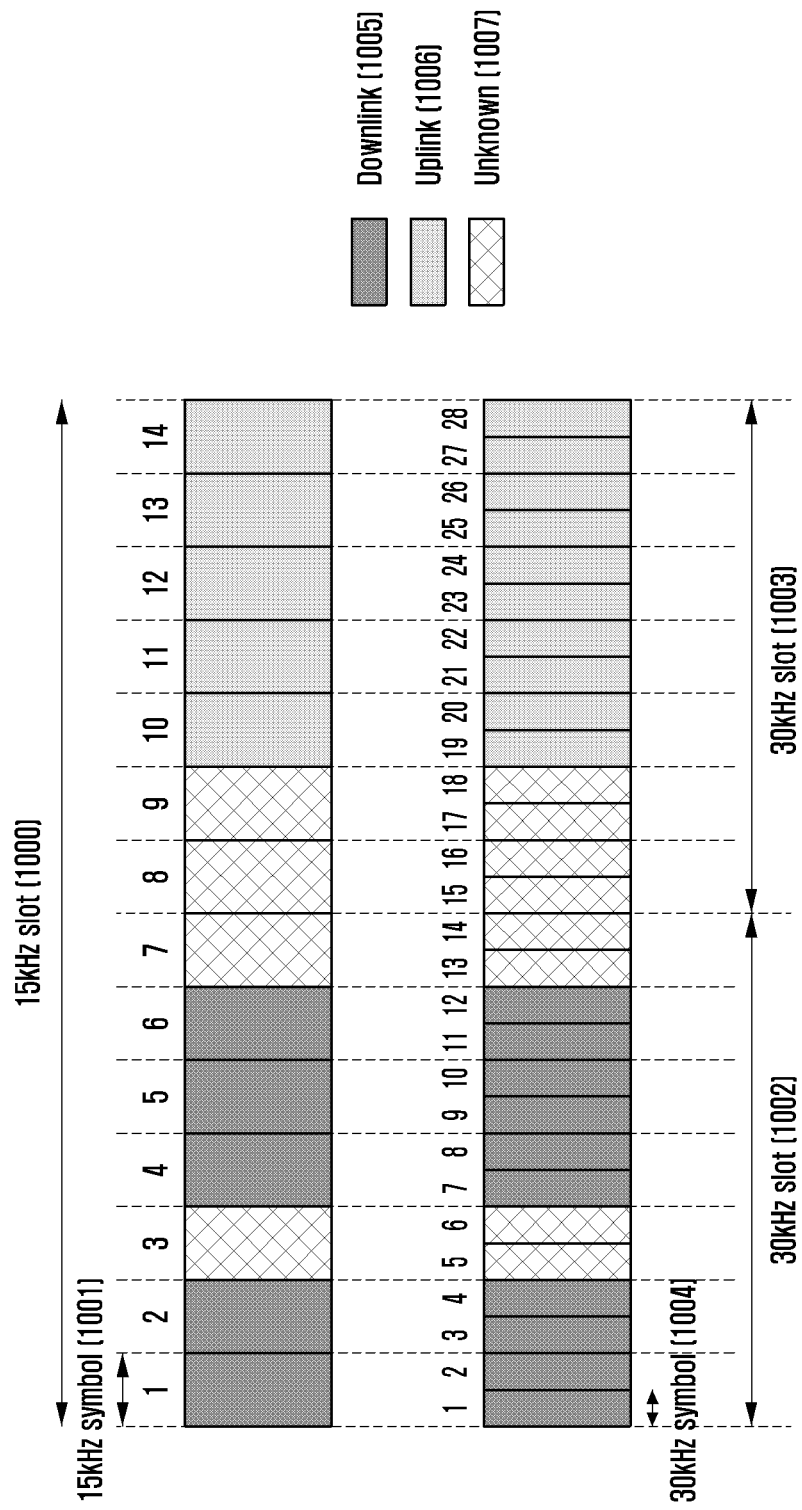
FIG. 10 illustrates an example SFI period having different subcarrier spacing according to an embodiment of the disclosure.

FIG. 10 illustrates an example SFI period having different subcarrier spacing according to an embodiment of the disclosure.

Referring to FIG. 10, a 15 kHz slot 100 can include 14 symbols 1001 and a first 30 kHz slot 1002 and a second 30 kHz slot 1003 can include a total of 28 symbols 1004. The downlink of a first OFDM symbol 1001 of 15 kHz is applied to the downlink of first and second OFDM symbols of 30 kHz. Accordingly, the terminal may determine that the formats of an nth OFDM symbol of 15 kHz is applied to the format of $2n-1^{th}$ and $2n^{th}$ OFDM symbols of 30 kHz.

Figure 11:
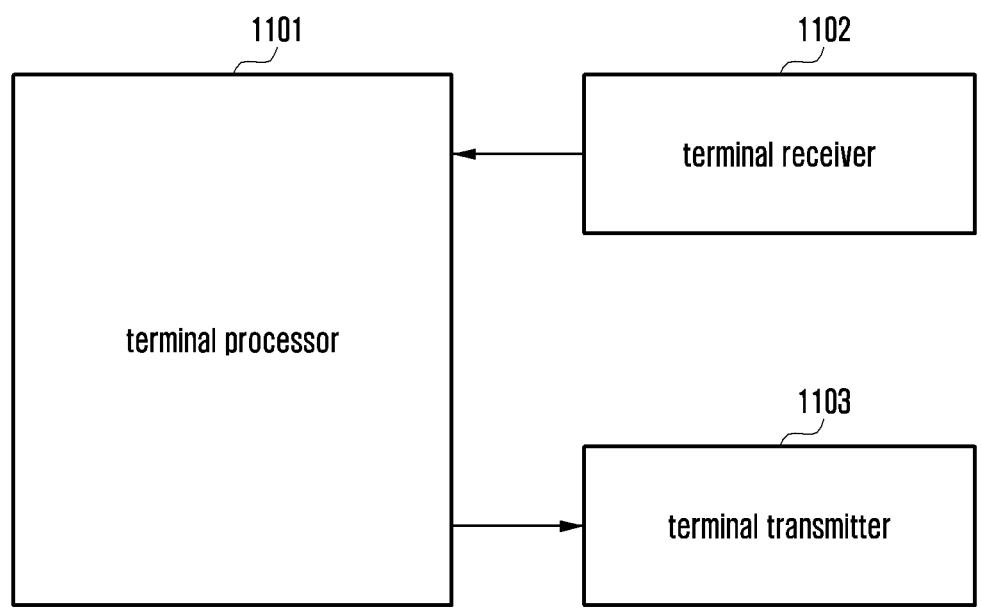
FIG. 11 is a block diagram of a terminal according to an embodiment of the disclosure.
Figure 12:
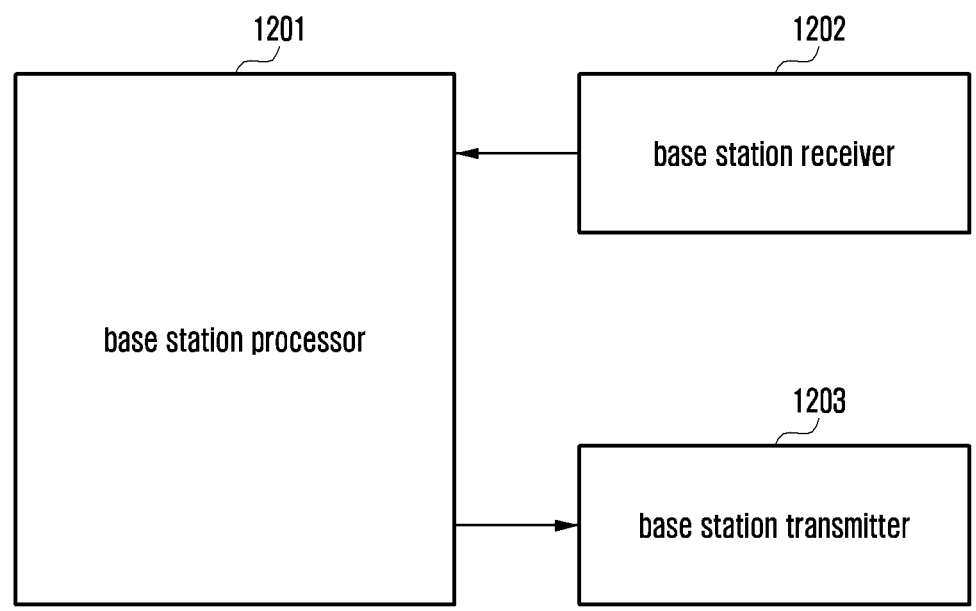
FIG. 12 is a block diagram of a base station according to an embodiment of the disclosure.

The transmitters, receivers, and controllers of the terminal and the base station for implementing the embodiments of the disclosure are illustrated in FIGS. 11 and 12, respectively. A method of performing transmission/reception by the base station and the terminal to apply a method of transmitting/receiving a group downlink control channel in the 5G communication system corresponding to the embodiment is illustrated, and for the method, the transmitters, the receivers, and the processors of the base station and the terminal are required to operate according to the embodiment.

FIG. 11 is a block diagram of the terminal according to an embodiment of the disclosure.

Referring to FIG. 11, the terminal according to the disclosure may include a terminal processor 1101, a terminal receiver 1102, and a terminal transmitter 1103.

The terminal processor 1101 may control a series of processes according to which the terminal may operate according to the above-described embodiments of the disclosure. For example, the method of configuring transmission of the group common-PDCCH (GC-PDCCH) including the SFI, the method of configuring the unknown symbol, the method of monitoring control region, and the method of configuring the control region according to an embodiment of the disclosure may be controlled in different manners. The terminal receiver 1102 and the terminal transmitter 1103 are commonly called a transceiver in the embodiments of the disclosure. The transceiver may transmit and receive a signal to/from the base station. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal through a wireless channel, output the signal to the terminal processor 1101, and transmit the signal output from the terminal processor 1101 through the wireless channel.

FIG. 12 is a block diagram illustrating an internal structure of the base station according to an embodiment of the disclosure.

Referring to FIG. 12, the base station according to the disclosure may include a base station processor 1201, a base station receiver 1202, and a base station transmitter 1203.

The base station processor 1201 may control a series of processes in which the base station may operate according to the above-described embodiments of the disclosure. For example, the method of configuring transmission of the GC-PDCCH including the SFI, the method of configuring the unknown symbol, the method of transmitting control information, and the method of configuring the control region according to an embodiment of the disclosure may be controlled in different manners. The base station receiver 1202 and the base station transmitter 1203 are commonly called a transceiver in the embodiments of the disclosure. The transceiver may transmit and receive a signal to/from the terminal. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver outputs, to the base station processor 1201, a signal received via a radio channel, and transmits a signal output from the base station processor 1201 via a radio channel.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) message including first information on a plurality of slot format combinations, second information on an identification (ID) of a serving cell for which the plurality of slot format combinations are applicable, third information on a slot format indicator radio network temporary identifier (SFI-RNTI), and fourth information on a reference subcarrier spacing for the plurality of slot format combinations, wherein a slot format combination among the plurality of slot format combinations includes at least one slot format, and wherein each slot format of the at least one slot format indicates each symbol in a slot as one symbol from among symbols comprising a downlink symbol, an uplink symbol, and a flexible symbol;
   receiving, from the base station, first downlink control information (DCI) including a slot format indicator (SFI), wherein a cyclic redundancy check (CRC) of the first DCI is scrambled by the SFI-RNTI;
   identifying a first slot format combination corresponding to the SFI among the plurality of slot format combinations, wherein the SFI is included in the first DCI scrambled by the SFI-RNTI and the SFI-RNTI is identified based on the third information included in the RRC message; and
   communicating, with the base station on the serving cell based on the second information, in the at least one slot by applying the identified first slot format combination,
   wherein the terminal receives a downlink signal in the flexible symbol in a first case that second DCI is received and indicates to receive the downlink signal in the flexible symbol,
   wherein the terminal transmits an uplink signal in the flexible symbol in a second case that the second DCI is received and indicates to transmit the uplink signal in the flexible symbol, and
   wherein the first DCI is received by a group common signaling for a plurality of terminals and the second DCI is received by a terminal-specific signaling.

2. The method of claim 1, wherein the first slot format combination is applied to the at least one slot with a subcarrier spacing which is equal to or larger than the reference subcarrier spacing.

3. The method of claim 1, wherein a number of the at least one slot is identified as a number of slot formats included in the first slot format combination.

4. A method performed by a base station in a wireless communication system, the method comprising:
   transmitting, to a terminal, a radio resource control (RRC) message including first information on a plurality of slot format combinations, second information on an identification (ID) of a serving cell for which the plurality of slot format combinations are applicable, third information on a slot format indicator radio network temporary identifier (SFI-RNTI), and fourth information associated on a reference subcarrier spacing for the plurality of slot format combinations, wherein a slot format combination among the plurality of slot format combinations includes at least one slot format, and wherein each slot format among the at least one slot format indicates each symbol in a slot as one symbol from among symbols comprising a downlink symbol, an uplink symbol, and a flexible symbol;
   transmitting, to the terminal, first downlink control information (DCI) including a slot format indicator (SFI), wherein a cyclic redundancy check (CRC) of the first DCI is scrambled by the SFI-RNTI; and communicating, with the terminal on the serving cell based on the second information, in at least one slot by applying an identified first slot format combination among the plurality of slot format combinations, wherein the identified first slot format combination corresponds to the SFI, wherein the SFI is included in the first DCI scrambled by the SFI-RNTI and the SFI-RNTI is identified based on the third information included in the RRC message, wherein the base station transmits a downlink signal in the flexible symbol in a first case that second DCI is transmitted and indicates to transmit the downlink signal in the flexible symbol, wherein the base station receives an uplink signal in the flexible symbol in a second case that the second DCI is transmitted and indicates to receive the uplink signal in the flexible symbol, and wherein the first DCI is transmitted by a group common signaling for a plurality of terminals and the second DCI is transmitted by a terminal-specific signaling.

5. The method of claim 4,
wherein the first slot format combination is applied to the at least one slot with a subcarrier spacing which is equal to or larger than the reference subcarrier spacing.

6. The method of claim 4,
wherein a number of the at least one slot is identified as a number of slot formats included in the first slot format combination.

7. A terminal in a wireless communication system, the terminal comprising:
a transceiver configured to transmit and receive a signal; and
a controller configured to:
receive, from a base station, a radio resource control (RRC) message including first information on a plurality of slot format combinations, second information on an identification (ID) of a serving cell for which the plurality of slot format combinations are applicable, third information on a slot format indicator radio network temporary identifier (SFI-RNTI), and fourth information on a reference subcarrier spacing for the plurality of slot format combinations, wherein a slot format combination among the plurality of slot format combinations includes at least one slot format, and wherein each slot format of the at least one slot format indicates each symbol in a slot as one symbol from among symbols comprising a downlink symbol, an uplink symbol, and a flexible symbol,
receive, from the base station, first downlink control information (DCI) including a slot format indicator (SFI), wherein a cyclic redundancy check (CRC) of the first DCI is scrambled by the SFI-RNTI,
identify a first slot format combination corresponding to the SFI among the plurality of slot format combinations, wherein the SFI is included in the first DCI scrambled by the SFI-RNTI and the SFI-RNTI is identified based on the third information included in the RRC message, and
communicate, with the base station on the serving cell based on the second information, in the at least one slot by applying the identified first slot format combination,
wherein the terminal receives a downlink signal in the flexible symbol in a first case that second DCI is received and indicates to receive the downlink signal in the flexible symbol, wherein the terminal transmits an uplink signal in the flexible symbol in a second case that the second DCI is received and indicates to transmit the uplink signal in the flexible symbol, and wherein the first DCI is received by a group common signaling for a plurality of terminals and the second DCI is received by a terminal-specific signaling.

8. The terminal of claim 7,
wherein the first slot format combination is applied to the at least one slot with a subcarrier spacing which is equal to or larger than the reference subcarrier spacing.

9. The terminal of claim 7,
wherein a number of the at least one slot is identified as a number of slot formats included in the first slot format combination.

10. A base station in a wireless communication system, the base station comprising:
a transceiver configured to transmit and receive a signal; and
a controller configured to:
transmit, to a terminal, a radio resource control (RRC) message including first information on a plurality of slot format combinations, second information on an identification (ID) of a serving cell for which the plurality of slot format combinations are applicable, third information on a slot format indicator radio network temporary identifier (SFI-RNTI), and fourth information associated on a reference subcarrier spacing for the plurality of slot format combinations, wherein each a slot format combination among the plurality of slot format combinations includes at least one slot format, and wherein each slot format among the at least one slot format indicates each symbol in a slot as one symbol from among a symbols comprising a downlink symbol, an uplink symbol, and a flexible symbol,
transmit, to the terminal, first downlink control information (DCI) including a slot format indicator (SFI), wherein a cyclic redundancy check (CRC) of the first DCI is scrambled by the SFI-RNTI, and
communicate, with the terminal on the serving cell based on the second information, in at least one slot by applying an identified first slot format combination among the plurality of slot format combinations,
wherein the identified first slot format combination corresponds to the SFI,
wherein the SFI is included in the first DCI scrambled by the SFI-RNTI and the SFI-RNTI is identified based on the third information included in the RRC message,
wherein the base station transmits a downlink signal in the flexible symbol in a first case that second DCI is transmitted and indicates to transmit the downlink signal in the flexible symbol,
wherein the base station receives an uplink signal in the flexible symbol in a second case that the second DCI is transmitted and indicates to receive the uplink signal in the flexible symbol, and
wherein the first DCI is transmitted by a group common signaling for a plurality of terminals and the second DCI is transmitted by a terminal-specific signaling.

11. The base station of claim 10, wherein the first slot format combination is applied to the at least one slot with a subcarrier spacing which is equal to or larger than the reference subcarrier spacing.

12. The base station of claim 10, wherein a number of the at least one slot is identified as a number of slot formats included in the first slot format combination.

* * * * *